(12) United States Patent
Yoshimura et al.

(10) Patent No.: US 10,142,981 B2
(45) Date of Patent: Nov. 27, 2018

(54) TERMINAL APPARATUS, BASE STATION APPARATUS, AND COMMUNICATION METHOD

(71) Applicant: SHARP KABUSHIKI KAISHA, Sakai, Osaka (JP)

(72) Inventors: Tomoki Yoshimura, Sakai (JP); Katsuya Kato, Sakai (JP); Osamu Nakamura, Sakai (JP); Ryota Yamada, Sakai (JP); Hiromichi Tomeba, Sakai (JP); Jungo Goto, Sakai (JP); Yasuhiro Hamaguchi, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/553,185

(22) PCT Filed: Feb. 24, 2016

(86) PCT No.: PCT/JP2016/055353
§ 371 (c)(1),
(2) Date: Aug. 24, 2017

(87) PCT Pub. No.: WO2016/136779
PCT Pub. Date: Sep. 1, 2016

(65) Prior Publication Data
US 2018/0077687 A1  Mar. 15, 2018

(30) Foreign Application Priority Data

Feb. 26, 2015  (JP) .................................. 2015-036035

(51) Int. Cl.
*H04W 72/04* (2009.01)
*H04L 27/36* (2006.01)
*H04L 27/38* (2006.01)

(52) U.S. Cl.
CPC ........... *H04W 72/042* (2013.01); *H04L 27/36* (2013.01)

(58) Field of Classification Search
CPC ..... H04L 27/36; H04L 27/366; H04W 72/042
See application file for complete search history.

(56) References Cited

U.S. PATENT DOCUMENTS 6,005,896 A * 12/1999 Maruyama ............ H04L 1/0003
329/316
7,526,035 B2  4/2009 Suh et al.
(Continued)

FOREIGN PATENT DOCUMENTS

CN  103188061 A  7/2013
EP  2993951 A1  3/2016
(Continued)

OTHER PUBLICATIONS

RP-142315, "Enhanced Multiuser Transmission and Network Assisted Interference Cancellation", 3GPP TSG RAN Meeting #66, 2014.12.

Primary Examiner — Ahmed Elallam
(74) Attorney, Agent, or Firm — ScienBiziP, P.C.

(57) ABSTRACT

A signal that is transmitted to a terminal apparatus itself is demodulated with high precision, and throughput is improved. A terminal apparatus that communicates with a base station apparatus includes a signal detection unit that demodulates a signal that is transmitted to the terminal apparatus itself, based on first modulation mapping in a case where a predetermined transmission mode is configured, and that demodulates a signal based on second modulation mapping in a case where a transmission mode other than the predetermined transmission mode is configured. A base station apparatus that communicates with a terminal apparatus includes a modulation unit that performs modulation using first modulation mapping from bits addressed to a plurality of terminal apparatuses, in a case where a prede-
(Continued)

termined transmission mode is configured, and that performs modulation using second modulation mapping from bits that are addressed to one terminal apparatus, in a case where a transmission mode other than the predetermined transmission mode is configured.

8 Claims, 8 Drawing Sheets

(56) References Cited

U.S. PATENT DOCUMENTS

| | | | |
|---|---|---|---|
| 7,965,793 B2* | 6/2011 | Golitschek Edler Von Elbwart et al. | H04L 1/18 375/260 |
| 9,826,515 B2* | 11/2017 | Freda | H04W 72/042 |
| 2005/0238108 A1 | 10/2005 | Suh et al. | |
| 2013/0196700 A1 | 8/2013 | Tiirola et al. | |
| 2014/0369290 A1 | 12/2014 | Yang et al. | |
| 2015/0358046 A1 | 12/2015 | Cronin | |
| 2016/0036619 A1* | 2/2016 | Yan | H04L 27/3483 370/329 |
| 2016/0037460 A1 | 2/2016 | Benjebbour et al. | |
| 2016/0073382 A1 | 3/2016 | Li et al. | |
| 2016/0219600 A1* | 7/2016 | Li | H04W 72/1231 |
| 2018/0115385 A1* | 4/2018 | Kato | H04J 15/00 |

FOREIGN PATENT DOCUMENTS

| | | |
|---|---|---|
| JP | 2008-206045 | 9/2008 |
| JP | 4745334 B2 | 8/2011 |
| WO | 2014/104114 A1 | 7/2014 |
| WO | 2014/162819 A1 | 10/2014 |

* cited by examiner

FIG. 5

TERMINAL APPARATUS, BASE STATION APPARATUS, AND COMMUNICATION METHOD

TECHNICAL FIELD

The present invention relates to a terminal apparatus, a base station apparatus, and a communication method.

BACKGROUND ART

In recent years, with the spread of smartphones and tablets, the amount of traffic in mobile transmission has been increasing exponentially, and is expected to increase in the future as well. In NPL 1, Non-Orthogonal Multiple Access (NOMA) in which a terminal remote from and a terminal close to a base station share the same resource is described as one measure to cope with such increase in the amount of wireless traffic. A base station apparatus that uses the NOMA assigns a high power and a low-rate Modulation and Coding Scheme (MCS) to a remote terminal and a low power and a high-rate MCS to a nearby terminal and adds modulation signals generated based on this assignment.

CITATION LIST

Non Patent Literature

NPL 1: RP-142315, "Enhanced Multiuser Transmission and Network Assisted Interference Cancellation", 3GPP TSG RAN Meeting #66, December 2014

SUMMARY OF INVENTION

Technical Problem

However, because in the NOMA, a plurality of terminal apparatuses share the same resource, it is desired to remove or suppress the interference signals and to demodulate with high precision a signal that is transmitted to the terminal apparatus itself.

An object of the present invention, which was made in view of this situation, is to provide a terminal apparatus, a base station apparatus, and a communication method, in all of which a signal that is transmitted to the terminal apparatus itself can be demodulated with high precision and an improvement in throughput is possible.

Solution to Problem

In order to deal with the problems described above, constitutions of a terminal apparatus, a base station apparatus, and a communication method according to the present invention are as follows.

(1) That is, a terminal apparatus according to the present invention is a terminal apparatus that communicates with a base station apparatus and includes a signal detection unit that demodulates a signal that is transmitted to the terminal apparatus itself, based on first modulation mapping in a case where a predetermined transmission mode is configured, and that demodulates a signal that is transmitted to the terminal apparatus itself, based on second modulation mapping in a case where a transmission mode other than the predetermined transmission mode is configured.

(2) Furthermore, in the terminal apparatus according to (1) described above, the signal detection unit obtains the first modulation mapping based on the second modulation mapping, and demodulates the signal that is transmitted to the terminal apparatus itself.

(3) Furthermore, in the terminal apparatus according to (1) described above, the signal detection unit demodulates the signal that is transmitted to the terminal apparatus itself, based on the second modulation mapping.

(4) Furthermore, the terminal apparatus according to (3) described above further includes a reception unit that receives information indicating a modulation scheme for an interference signal and information relating to a transmit power of the interference signal, from the base station apparatus, in which the signal detection unit demodulates a signal that is transmitted to the terminal apparatus itself based on the information indicating the modulation scheme for the interference signal, the information relating to the transmit power of the interference signal, and the second modulation mapping.

(5) That is, a base station apparatus according to the present invention is a base station apparatus that communicates with a terminal apparatus and includes a modulation unit that performs modulation using first modulation mapping from bits addressed to a plurality of terminal apparatuses, in a case where a predetermined transmission mode is configured, and that performs modulation using second modulation mapping from bits addressed to one terminal apparatus, in a case where a transmission mode other than the predetermined transmission mode is configured.

(6) Furthermore, in the base station apparatus according to (5) described above, the first modulation mapping and the second modulation mapping correspond to a gray code.

(7) Furthermore, in the base station apparatus according to (5) described above, the first modulation mapping is determined based on the second modulation mapping.

(8) Furthermore, the base station apparatus according to (7) described above further includes a transmission unit that transmits information indicating a modulation scheme for an interference signal and information relating to a transmit power of the interference signal, in which the first modulation mapping is determined based on the information indicating the modulation scheme for the interference signal, the information relating to the transmit power of the interference signal, and the second modulation mapping.

(9) Furthermore, a communication method according to the present invention is a communication method for use in a terminal apparatus, the method including a step of demodulating a signal that is transmitted to the terminal apparatus itself, based on first modulation mapping in a case where a predetermined transmission mode is configured, and demodulating a signal that is transmitted to the terminal apparatus itself, based on second modulation mapping in a case where a transmission mode other than the predetermined transmission mode is configured.

(10) Furthermore, a communication method according to the present invention is a communication method for use in a base station apparatus, the method including a step of performing modulation using first modulation mapping from bits addressed to a plurality of terminal apparatuses, in a case where a predetermined transmission mode is configured, and performing modulation using second modulation mapping from bits addressed to one terminal apparatus, in a case where a transmission mode other than the predetermined transmission mode is configured.

Advantageous Effects of Invention

According to the present invention, a terminal apparatus can improve transmission performance.

BRIEF DESCRIPTION OF DRAWINGS

FIG. 5 is a diagram illustrating an example of the second modulation mapping in compliance with 64 QAM according to the present embodiment.

DESCRIPTION OF EMBODIMENTS

A communication system according to the present invention includes a base station apparatus (a transmission apparatus, a cell, a transmission point, a transmit antenna group, a transmit antenna port group, a component carrier, or an eNodeB) and a terminal apparatus (a terminal, a mobile terminal, a reception point, a reception terminal, a reception apparatus, a receive antenna group, a receive antenna port group or a UE).

According to the present embodiment, "X/Y" includes the meaning of "X or Y". According to the present embodiment, "X/Y" includes the meaning of "X and Y". According to the present embodiment, "X/Y" includes the meaning of "X and/or Y".

Figure 1:
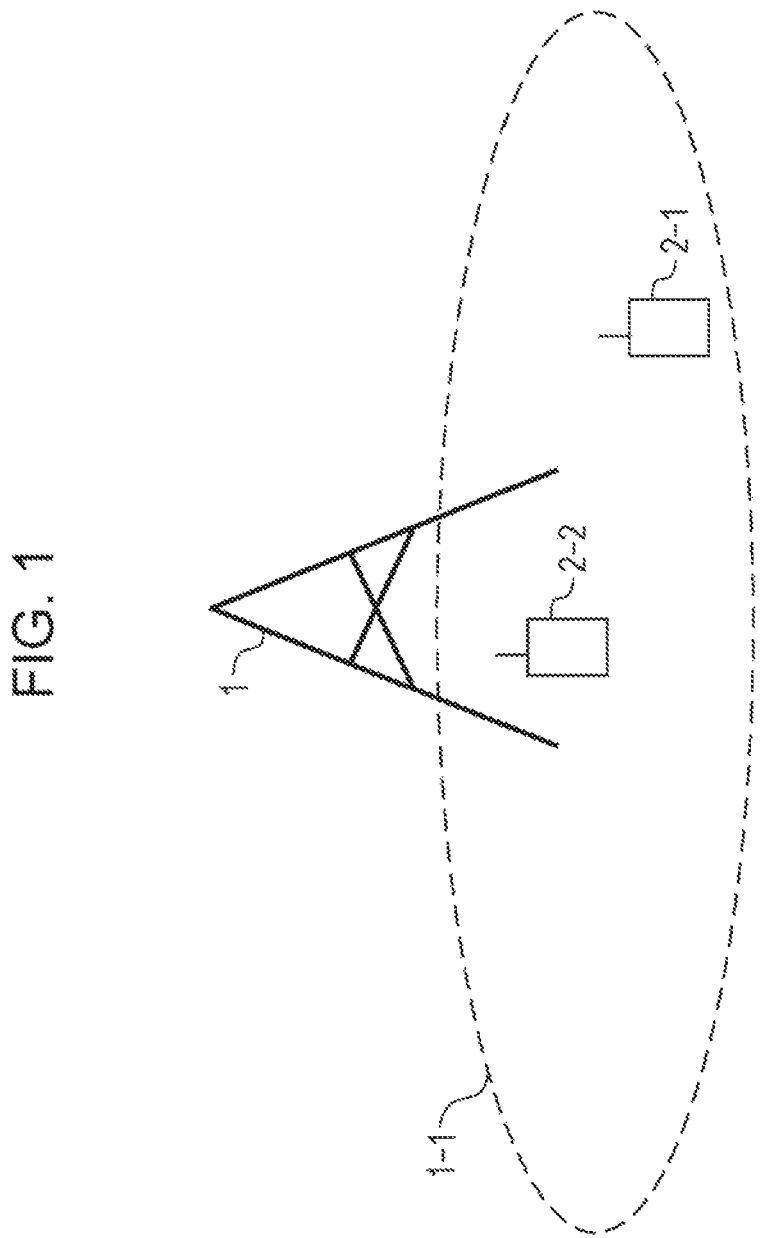
FIG. 1 is a diagram illustrating an example of a communication system according to the present embodiment.

FIG. 1 is a diagram illustrating an example of a communication system according to the present embodiment. As illustrated in FIG. 1, the communication system according to the present embodiment includes a base station apparatus 1 and terminal apparatuses 2-1 and 2-2. The terminal apparatuses 2-1 and 2-2 are collectively also referred to as a terminal apparatus 2. Furthermore, coverage 1-1 is a range (a communication area) in which the base station apparatus 1 is capable of making a connect to the terminal apparatus.

In FIG. 1, in uplink wireless communication from the terminal apparatus 2 to the base station apparatus 1, the following uplink physical channels are used. The uplink physical channels are used to transmit information that is output from a higher layer.

Physical Uplink Control Channel (PUCCH)
Physical Uplink Shared Channel (PUSCH)
Physical Random Access Channel (PRACH)

The PUCCH is used to transmit Uplink Control Information (UCI). At this point, the Uplink Control Information includes a positive acknowledgement (ACK) or a negative acknowledgement (NACK) (ACK or NACK) of downlink data (a downlink transport block or a Downlink-Shared Channel (DL-SCH)). The ACK or NACK of the downlink data is also referred to as an HARQ-ACK or HARQ feedback.

Furthermore, the Uplink Control Information includes Channel State Information (CSI) for downlink. Furthermore, the Uplink Control Information includes a Scheduling Request (SR) that is used to make a request for a resource for an Uplink-Shared Channel (UL-SCH).

The PUSCH is used to transmit uplink data (an uplink transport block or the UL-SCH). Furthermore, the PUSCH may be used to transmit the ACK or NACK and/or the Channel State Information, along with the uplink data. Furthermore, the PUSCH may be used to transmit only the Uplink Control Information.

Furthermore, the PUSCH is used to transmit an RRC message. The RRC message is information or a signal that is processed in a Radio Resource Control (RRC) layer. Furthermore, the PUSCH is used to transmit a MAC Control Element (CE). At this point, the MAC CE is information or a signal that is processed (transmitted) in a Medium Access Control (MAC) layer.

For example, a power headroom may be included in the MAC CE and may be reported through the PUSCH. That is, a MAC CE field may be used to indicate a power headroom level.

The PRACH is used to transmit a random access preamble.

Furthermore, in the uplink wireless communication, an Uplink Reference Signal (UL RS) is used as an uplink physical signal. The uplink physical signal is not used to transmit the information that is output from the higher layer, but is used by a physical layer. At this point, a Demodulation Reference Signal (DMRS) and a Sounding Reference Signal (SRS) are included in the Uplink Reference Signal.

The DMRS is associated with transmission of the PUSCH or the PUCCH. For example, the base station apparatus 1 uses the DMRS to perform channel reconfiguration of the PUSCH or the PUCCH. The SRS is not associated with the transmission of the PUSCH or the PUCCH. For example, the base station apparatus 1 uses the SRS to measure an uplink channel state.

In FIG. 1, in downlink wireless communication from the base station apparatus 1 to the terminal apparatus 2, the following downlink physical channels are used. The downlink physical channels are used to transmit the information that is output from the higher layer.

Physical Broadcast Channel (PBCH)
Physical Control Format Indicator Channel (PCFICH)
Physical Hybrid automatic repeat request Indicator Channel (PHICH)
Physical Downlink Control Channel (PDCCH)
Enhanced Physical Downlink Control Channel (EPDCCH)
Physical Downlink Shared Channel (PDSCH)

The PBCH is used to broadcast a Master Information Block (MIB) (a Broadcast Channel (BCH)) that is used in the terminal apparatus 2. The PCFICH is used to transmit information indicating a region (for example, the number of OFDM symbols) that is used for transmission of the PDCCH.

The PHICH is used to transmit the ACK or NACK of the uplink data that is received by the base station apparatus 1. That is, the PHICH is used to transmit an HARQ indicator (HARQ feedback) indicating the ACK or NACK of the uplink data.

The PDCCH and the EPDCCH are used to transmit Downlink Control Information (DCI). At this point, a plurality of DCI formats are defined for transmission of the Downlink Control Information. That is, a field for the Downlink Control Information is defined in a DCI format and is mapped to an information bit.

For example, DCI format 1A that is used for scheduling of one PDSCH (transmission of one downlink transport block) in one cell is defined as a DCI format for the downlink.

For example, information relating to PDSCH resource allocation, information relating to a Modulation and Coding Scheme (MCS) for the PDSCH, and the Downlink Control Information such as a TPC command for the PUCCH are included in the DCI format for the downlink. At this point, the DCI format for the downlink is also referred to as a downlink grant (or a downlink assignment).

Furthermore, for example, DCI format 0 that is used for scheduling of one PUSCH (transmission of one uplink transport block) in one cell is defined as a DCI format for uplink.

For example, information relating to PUSCH resource allocation, information relating to an MCS for the PUSCH, and Uplink Control Information such as a TPC command for the PUSCH are included in the DCI format for the uplink. The DCI format for the uplink is also referred to as an uplink grant (or an uplink assignment).

Furthermore, the DCI format for the uplink can be used to make a request (a CSI request) for the Channel State Information (which is also referred to as received quality information) for the downlink. A Rank Indicator (RI) indicating the suitable number of spatial multiplexes, a Precoding Matrix Indicator (PMI) indicating a suitable precoder, a Channel Quality Indicator (CQI) indicating a suitable transmission rate, and the like correspond to the Channel State Information.

Furthermore, the DCI format for the uplink can be used for a configuration indicating an uplink resource to which a channel state information report (CSI feedback report or CSI reporting) that is fed back by the terminal apparatus to the base station apparatus is mapped. For example, the channel state information report can be used for the configuration indicating the uplink resource in which Channel State Information (Periodic CSI) is regularly (periodically) reported. The channel state information report can be used for a mode configuration (a CSI report mode) in which the Channel State Information is regularly reported.

For example, the channel state information report can be used for the configuration indicating the uplink resource in which irregular Channel State Information (aperiodic CSI) is reported. The channel state information report can be used for the mode configuration (the CSI reporting mode) in which the Channel State Information is irregularly reported. The base station apparatus 1 can configure any one of the regular channel state information report and the irregular channel state information report. Furthermore, the base station apparatus 1 can also configure both of the regular channel state information report and the irregular channel state information report.

Furthermore, the DCI format for the uplink can be used for a configuration indicating a type of channel state information report that is fed back by the terminal apparatus to the base station apparatus. As types of channel state information reports, there are wideband CSI (for example, a Wideband CQI), narrowband CSI (for example, a Subband CQI), and the like.

Furthermore, the DCI format for the uplink can be used for a mode configuration that includes the regular channel state information report or the irregular channel state information report and the type of channel state information report. For example, there are a mode in which the irregular channel state information report and the wideband CSI are reported, a mode in which the irregular channel state information report and the narrowband CSI are reported, a mode in which the irregular channel state information report, the wideband CSI, and the narrowband CSI are reported, a mode in which the regular channel state information report and the wideband CSI are reported, a mode in which the regular channel state information report and the narrowband CSI are reported, and a mode in which the regular channel state information report, the wideband CSI, and the narrowband CSI are reported.

In a case where a PDSCH resource is scheduled using the downlink assignment, the terminal apparatus 2 receives the downlink data, on the scheduled PDSCH. Furthermore, in a case where a PUSCH resource is scheduled using the uplink grant, the terminal apparatus 2 transmits the uplink data and/or the Uplink Control Information, on the scheduled PUSCH.

The PDSCH is used to transmit the downlink data (the downlink transport block or the DL-SCH). Furthermore, the PDSCH is used to transmit a system information block type-1 message. The system information block type-1 message is cell-specific (cell-peculiar) information.

Furthermore, the PDSCH is used to transmit a system information message. The system information message includes a system information block X other than the system information block type-1. The system information message is cell-specific (cell-peculiar) information.

Furthermore, the PDSCH is used to transmit the RRC message. At this point, the RRC message that is transmitted from the base station apparatus 1 may be common to a plurality of terminal apparatuses 2 within a cell. Furthermore, the RRC message that is transmitted from the base station apparatus 1 may be a message (which is also referred to as dedicated signaling) dedicated to a certain terminal apparatus 2. That is, UE-specific (UE-peculiar) information is transmitted using a message dedicated to a certain terminal apparatus 2. Furthermore, the PDSCH is used to transmit the MAC CE.

At this point, the RRC message and/or the MAC CE are also referred to as higher layer signaling.

Furthermore, in the downlink wireless communication, a synchronization signal (SS) and a Downlink Reference Signal (DL RS) are used as downlink physical signals. The downlink physical signal is not used to transmit the information that is output from the higher layer, but is used by the physical layer.

The synchronization signal is used for the terminal apparatus 2 to be synchronized to a frequency domain for and a time domain for the downlink. Furthermore, the Downlink Reference Signal is used for the terminal apparatus 2 to perform the channel reconfiguration of the downlink physical channel. For example, the Downlink Reference Signal is used for the terminal apparatus 2 to calculate the Channel State Information for the downlink.

At this point, a Cell-specific Reference Signal (CRS), a UE-specific Reference Signal (URS) associated with the PDSCH, a Demodulation Reference Signal (DMRS) associated with the EPDCCH, a Non-Zero Power Channel State Information-Reference Signal (NZP CSI-RS), and a Zero Power Channel State Information-Reference Signal (ZP CSI-RS) are included in the Downlink Reference Signal.

The CRS is transmitted in all bands in a subframe, and is used for performing demodulation of the PBCH/PDCCH/PHICH/PCFICH/PDSCH. The URS associated with the PDSCH is transmitted in a subframe and a band that are used for transmission of the PDSCH with which the URS is associated, and is used for performing the demodulation of the PDSCH with which the URS is associated.

The DMRS that is associated with the EPDCCH is transmitted in a subframe and a band that are used for transmission of the EPDCCH with which the DMRS is associated. The DMRS is used to perform demodulation of the EPDCCH with which the DMRS is associated.

A resource for the NZP CSI-RS is configured by the base station apparatus 1. For example, the terminal apparatus 2 performs signal measurement (channel measurement) using the NZP CSI-RS. A resource for the ZP CSI-RS is configured by the base station apparatus 1. With a zero output, the base station apparatus 1 transmits the ZP CSI-RS. For example, the terminal apparatus 2 performs interference measurement on a resource to which the NZP CSI-RS corresponds.

At this point, the downlink physical channel and the downlink physical signal are also collectively referred to as a downlink signal. Furthermore, the uplink physical channel and the uplink physical signal are also collectively referred to as an uplink signal. Furthermore, the downlink physical channel and the uplink physical channel are also collectively referred to as a physical channel. Furthermore, the downlink physical signal and the uplink physical signal are also collectively referred to as a physical signal.

Furthermore, the BCH, the UL-SCH and the DL-SCH are transport channels. A channel that is used in the MAC layer is referred to as a transport channel. Furthermore, a unit of a transport channel that is used in the MAC layer is also referred to as a Transport Block (TB) or a MAC Protocol Data Unit (PDU). The Transport Block is a unit of data that is delivered by the MAC layer to the physical layer. In the physical layer, the Transport Block is mapped to a codeword, and coding processing and the like are performed on every codeword.

Figure 2:
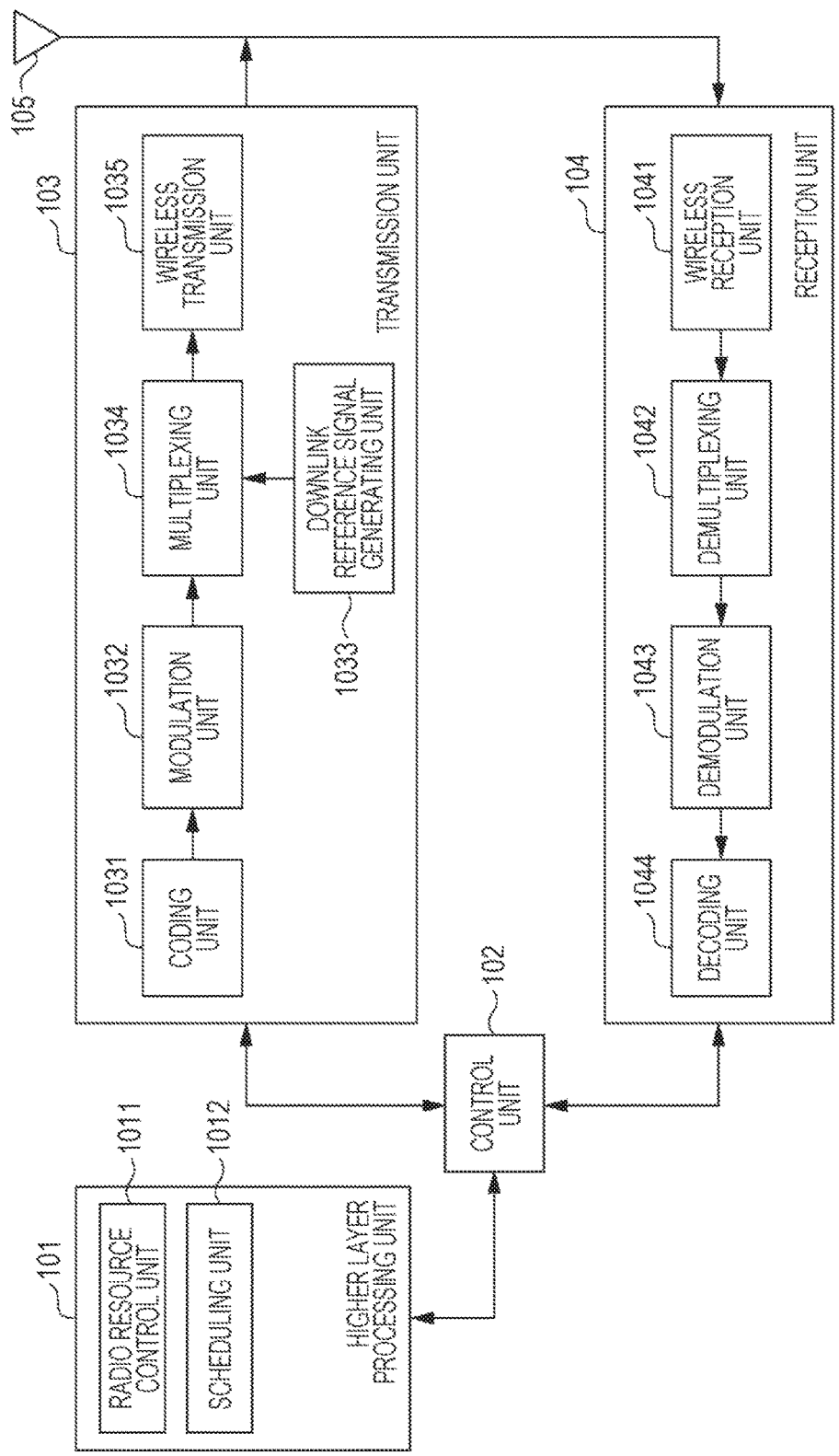
FIG. 2 is a schematic block diagram illustrating a configuration of a base station apparatus according to the present embodiment.

FIG. 2 is a schematic block diagram illustrating a constitution of the base station apparatus according to the present embodiment. As illustrated in FIG. 2, the base station apparatus is constituted to include a higher layer processing unit (a higher layer processing step) 101, a control unit (a control step) 102, a transmission unit (a transmission step) 103, a reception unit (a reception step) 104, and a transmit and receive antenna 105. Furthermore, the higher layer processing unit 101 is constituted to include a radio resource control unit (a radio resource control step) 1011 and a scheduling unit (a scheduling step) 1012. Furthermore, the transmission unit 103 is constituted to include a coding unit (a coding step) 1031, a modulation unit (a modulation step) 1032, a downlink reference signal generating unit (a downlink reference signal generating step) 1033, a multiplexing unit (a multiplexing step) 1034, and a wireless transmission unit (a wireless transmission step) 1035. Furthermore, the reception unit 104 is constituted to include a wireless reception unit (a wireless reception step) 1041, a demultiplexing unit (a demultiplexing step) 1042, a demodulation unit (a demodulation step) 1043, and a decoding unit (a decoding step) 1044.

The higher layer processing unit 101 performs processing of the Medium Access Control (MAC) layer, a Packet Data Convergence Protocol (PDCP) layer, a Radio Link Control (RLC) layer, and the Radio Resource Control (RRC) layer. Furthermore, the higher layer processing unit 101 generates information necessary to perform control of the transmission unit 103 and the reception unit 104, and outputs the generated information to the control unit 102.

The higher layer processing unit 101 receives information relating to the terminal apparatus, such as a function (UE capability) of the terminal apparatus, from the terminal apparatus. In other words, the terminal apparatus transmits the function of the terminal apparatus itself to the base station apparatus using the higher layer signaling.

It is noted that, as will be described below, information relating to the terminal apparatus includes information indicating whether or not the terminal apparatus supports a predetermined function, or information indicating completion of introduction and test of the predetermined function by the terminal apparatus. It is noted that, as will be described below, whether or not the predetermined function is supported includes whether or not the introduction and the test of the predetermined function is completed. For example, in a case where the terminal apparatus supports the predetermined function, information indicating that the terminal apparatus supports the predetermined function, or the information indicating the terminal apparatus completes the introduction and test of the predetermined function is transmitted. For example, in a case where the terminal apparatus does not support the predetermined function, the information indicating that the terminal apparatus supports the predetermined function, or the information indicating the terminal apparatus completes the introduction and test of the predetermined function is not transmitted. That is, whether or not to transmit the information indicating whether or not the terminal apparatus supports the predetermined function, or the information indicating that the terminal apparatus completes the instruction and test of the predetermined function indicates whether or not the terminal apparatus supports the predetermined function.

For example, in the case where the terminal apparatus supports the predetermined function, the terminal apparatus transmits the information (a parameter) indicating whether or not the predetermined function is supported. In the case where the terminal apparatus does not support the predetermined function, the terminal apparatus does not transmit the information (the parameter) indicating whether or not the predetermined function is supported. That is, whether or not the predetermined function is supported is notified depending on whether or not the information (the parameter) indicating whether or not the predetermined function is supported is transmitted. It is noted that the information (the parameter) indicating whether or not the predetermined function is supported may be notified using a bit that is 1, that is, a bit that is 0 or a bit that is 1.

Functions of the terminal apparatus include a parameter indicating whether or not Non-Orthogonal Multiple Access (NOMA) (Multi-user (MU)-Network assisted Interference suppression and cancellation (NAICS), MU-Interference Cancellation (IC), or superposition coding) is supported. It is noted that the support of the NOMA by the terminal apparatus can be made to be mandatory in a predetermined resource. In a case where the Non-Orthogonal Multiple Access is supported, it can be indicated that information relating to the Non-Orthogonal Multiple Access, more precisely, Downlink Control Information relating to the Non-Orthogonal Multiple Access and/or configuration formation (assist information) in the higher layer, which relates to the Non-Orthogonal Multiple Access, can be received, and/or that PDSCH interference in the same resource can be removed or suppressed using the same resource using the information relating to the Non-Orthogonal Multiple Access.

The base station apparatus 1 can multiplex a plurality of terminal apparatuses without dividing a resource that is a time, a frequency and a space (for example, an antenna port, a beam pattern, and a precoding pattern). A signal that results from the base station apparatus 1 multiplexing within the same resource, signals which are transmitted to the plurality of terminal apparatuses is hereinafter also referred to as a NOMA signal, and transmission of the NOMA signal to destinations, the plurality of terminal apparatuses, by the base station apparatus 1 is hereinafter also referred to NOMA transmission. It is noted that the base station apparatus 1 can perform the NOMA transmission in such a manner that the plurality of terminals are multiplexed using some or all of resources that are the time, the frequency, and the space.

The radio resource control unit 1011 generates or acquires from a higher node the downlink data (the Transport Block) that is mapped to the PDSCH for the downlink, the system information, the RRC message, the MAC CE, and the like. The radio resource control unit 1011 outputs the downlink data to the transmission unit 103, and outputs other information to the control unit 102. Furthermore, the radio resource control unit 1011 manages various pieces of configuration information of the terminal apparatus 2.

The radio resource control unit 1011 can configure information relating to a transmission mode (TM). Based on information relating to the UE capability (a UE function) of the terminal apparatus 2, the base station apparatus 1 can determine the transmission mode. For example, the transmission mode can include Single Input Single Output (SISO) transmission, Transmit Diversity, Multiple Input Multiple Output (MIMO) transmission, and the like. It is noted that the terminal apparatus notifies the base station apparatus of the information relating to the UE capability before the configuration of the transmission mode.

The base station apparatus 1 can configure a mode in which the NOMA transmission is performed. The radio resource control unit 1011 can generate information relating to a transmission mode (which is hereinafter also referred to as a "NOMA mode") that corresponds to the NOMA transmission, for the terminal apparatus 2 that supports the NOMA. Furthermore, the NOMA mode may be notified as information, such as the number of times of blind decoding, without being configured as the transmission mode. The information relating to the NOMA mode, for example, is transmitted as the higher layer signaling and/or the Downlink Control Information. In a case where the NOMA mode is configured, the terminal apparatus 2 removes or suppresses interference signal using the information relating to the NOMA mode.

Furthermore, regardless of the transmission mode (more precisely, although in the NOMA mode, and although in a transmission mode other than the NOMA mode), the base station apparatus 1 may transmit the information relating to the NOMA (assist information, supplementary information, control information, or configuration information) to the terminal apparatus. The information relating to the NOMA is transmitted using the higher layer signaling and/or a physical layer signal. Information relating to the NOMA includes part or all of information relating to a PA, information relating to the transmission mode or a transmit power for the PDSCH of the interference signal, information relating to the PMI or the PA of a serving cell, information (or information relating to a size such as the number of bits of the DCI) relating to the modulation scheme, the MCS, a redundancy version, a Radio Network Temporary Identifier (RNTI), or the number of times of the blind decoding of DCI, and modulation mapping information. It is noted that the PA is a transmit power ratio (a power offset) between the PDSCH and the CRS in an OFDM symbol to which the CRS is not mapped. The transmission mode is assist information for the terminal apparatus to know (detect) a transmission mode for the interference signal, such as a transmission mode for the interference signal or a candidate for the transmission mode in which the serving cell can be configured (is likely to be configured). Furthermore, modulation mapping will be described below. Furthermore, a modulation scheme indicates a modulation scheme for the terminal apparatus itself and/or a modulation scheme for the interference signal, and/or a composite modulation scheme. The composite modulation scheme is a modulation scheme that results from combining the modulation scheme for the terminal apparatus itself and the modulation scheme for the interference signal. For example, in a case where the modulation scheme for the terminal apparatus itself is QPSK and the modulation scheme for the interference signal is QPSK, the composite modulation scheme is 16 QAM. Furthermore, for example, in a case where the modulation scheme for the terminal apparatus itself is 16 QAM and the modulation scheme for the interference signal is QPSK, the composite modulation scheme is 64 QAM. It is noted that a modulation symbol which is generated with the composite modulation scheme is also referred to as a composite modulation symbol.

It is noted that in the example described above, the radio resource control unit 1011 is described as generating the information relating to the NOMA mode, but the present embodiment is not limited to this. For example, the scheduling unit 1012 can generate the information relating to the NOMA mode. A method will be described below in which the scheduling unit 1012 generates the information relating to the NOMA mode.

The scheduling unit 1012 can determine frequencies and subframes to which the physical channels (the PDSCH and PUSCH) are allocated, coding rates of and modulation schemes (or MCSs) and for the physical channels (the PDSCH and the PUSCH), the transmit power, and the like. The scheduling unit 1012 can perform scheduling, considering the presence and absence of the terminal apparatus that supports the NOMA. For example, in a case where the terminal apparatus 2-2 that approaches the base station apparatus supports the NOMA, the base station apparatus can perform the scheduling in such a manner that communication with the terminal apparatus 2-1 that is remote from the terminal apparatus 2-2 and the base station apparatus is performed using the same resource. An index that identifies whether or not the base station apparatus performs the NOMA can be set to be the CQI, the PMI, the RI, or the like that is fed back from the terminal apparatus, regardless of a distance. Furthermore, only in a case where both of the terminal apparatuses 2-1 and 2-2 support the NOMA, the base station apparatus can perform the NOMA on the terminal apparatuses 2-1 and 2-2.

The scheduling unit 1012 can generate the information relating to the NOMA mode. For example, in a case where the terminal apparatuses 2-1 to 2-2 are allocated to the same resource, information (for example, resource allocation information) that is used for the scheduling can be the information relating to the NOMA mode. More precisely, the base station apparatus 1 can include resource allocation information in the information relating to the NOMA, of the terminal apparatus 2. Furthermore, the scheduling unit 1012 can include information other than the information that is used for the scheduling, in the information relating to the NOMA mode or the information relating to the NOMA. The scheduling unit 1012 may individually generate the information relating to the NOMA mode or the information relating to the NOMA, for every resource block (or which may be a transport block and be a set of resources other than the transport block), and may individually generate the information relating to the NOMA mode or the information relating to the NOMA, for every terminal apparatus 2. More precisely, the base station apparatus 1 can transmit the information relating to the NOMA for every resource block, in a state of being included in the Downlink Control Information. Furthermore, in a case where a plurality of resources are transmitted to the terminal apparatus 2, the base station apparatus 1 can include the information relating to the NOMA for only one resource block. More precisely, the terminal apparatus 2 receives the information relating to the NOMA for every resource block, and removes or suppresses the interference signal against the resource block in which the information relating to the NOMA is received.

The scheduling unit 1012 generates information that is used for scheduling of the physical channels (the PDSCH and the PUSCH), based on a result of the scheduling. The scheduling unit 1012 outputs the generated information to the control unit 102.

For example, even in a case where the base station apparatus 1 transmits the information relating to the NOMA mode, to the terminal apparatus 2-2, the base station apparatus 1 and the terminal apparatus 2-2 can perform communication using a transmission method other than the NOMA transmission. More precisely, in the communication between the base station apparatus 1 and the terminal apparatus 2-2, the base station apparatus 1 can use the NOMA transmission for every resource block, and a transmission method other than the NOMA. In this case, the terminal apparatus 2-2 makes a change of a reception procession method for every resource block that is allocated to a destination that is the terminal apparatus 2-2 itself.

It is noted that, even in a case where the base station apparatus 1 allocates the same resource to the terminal apparatuses 2-1 to 2-2, the terminal apparatuses 2-1 to 2-2 can acquire only information relating to the scheduling for the terminal apparatuses 2-1 to 2-2 itself, respectively. In order for the terminal apparatus 2 to use the information relating to the scheduling, as the information relating to the NOMA mode, among the terminal apparatuses 2, the terminal apparatus (for example, the terminal apparatus 2-2) that supports at least the NOMA preferably acquires information relating to the scheduling for the terminal apparatuses 2-1 to 2-2. The base station apparatus 1 can include the information relating to the scheduling for the terminal apparatus 1, in the information relating to the scheduling for the terminal apparatus 2-2. Furthermore, the base station apparatus 1 can transmit information (for example, a Radio Network Temporary Identifier (RNTI), or the like) necessary to decode the information relating to the scheduling for the terminal apparatuses 2-1 to 2-2, to the terminal apparatus 2.

For example, in a case where the terminal apparatus 2-2 supports the NOMA and where the terminal apparatus 2-1 does not support the NOMA, the radio resource control unit 1011 can generate the information relating to a NOMA transmission mode or the information relating to the NOMA, only for the terminal apparatus 2-2 that supports the NOMA. Furthermore, the radio resource control unit 1011 can generate information relating to a transmission mode other than the NOMA mode, for the terminal apparatus 2-1.

In a case where the NOMA mode is configured, and/or in a case where the information relating to the NOMA is configured, the base station apparatus 1 can add signals that are transmitted to the terminal apparatus 2-1 and the terminal apparatus 2-2 using the same resource, and can transmit the resulting signal. The base station apparatus 1 can generate each of the signals (the modulation symbols) that are transmitted to the terminal apparatuses 2-1 and the terminal apparatus 2-2, according to the modulation mapping that is a mapping rule for a bit and a modulation symbol. In the case where the NOMA mode is configured, and/or in the case where the information relating to the NOMA is configured, the terminal apparatus 2 can perform demodulation and/or interference removal, based on the modulation mapping.

Furthermore, the base station apparatus 1 can generate the modulation symbol using modulation mapping different from that in a case where the NOMA mode is configured and/or the information relating to the NOMA is not configured, for the terminal apparatus 2 for which the NOMA mode is configured and/or for which the information relating to the NOMA is configured. Furthermore, in a case where modulation mapping information is transmitted, or where the modulation mapping information indicates different modulation mapping, the base station apparatus 1 can generate a modulation symbol using modulation mapping different from that in a case where the modulation mapping information is not transmitted or the modulation mapping information does not indicate different modulation mapping. It is noted that, modulation mapping in the case where the NOMA mode is configured and/or where the information relating to the NOMA is configured, or in the case where the modulation mapping information is transmitted and/or where the modulation mapping information indicates different mapping is also referred to as first modulation mapping. Furthermore, modulation mapping in the case where the NOMA mode is not configured and/or where the information relating to the NOMA is not configured, or in the case where the modulation mapping information is not transmitted or where the modulation mapping information does not indicate different mapping is also referred to as second modulation mapping. Furthermore, the modulation symbol that is generated with the first modulation mapping is also referred to as a first modulation symbol and the modulation symbol that is generated with the second modulation mapping is also referred to as a second modulation symbol. Furthermore, the first modulation mapping can be set to be modulation mapping that results from combining bits which are addressed to a plurality of terminal apparatuses. Furthermore, the terminal apparatus 2 can perform the demodulation based on the first modulation mapping, in the case where the NOMA mode is configured and/or where the information relating to the NOMA is configured, and can perform the demodulation based on the second modulation mapping, in the case where the NOMA mode is not configured and/or where the information relating to the NOMA is not configured. Furthermore, the terminal apparatus 2 performs the demodulation based on the first modulation mapping, in a case where the modulation mapping information is received, or in the case where the modulation mapping information indicates different modulation mapping, and performs the demodulation based on the second modulation mapping, in a case where the modulation mapping information is not received, or in the case where the modulation mapping information does not indicate the modulation mapping. It is noted that the modulation mapping information is information relating to the modulation mapping, and for example, is information indicating the first modulation mapping, or is information indicating the second modulation mapping.

Furthermore, the terminal apparatus 2 can determine whether or not the removal or the suppression of the interference signal is performed using the modulation mapping information. For example, in a case where the terminal apparatus 2 receives information indicating the first modulation mapping, the removal and the suppression of the interference signal can be performed.

Figure 3:
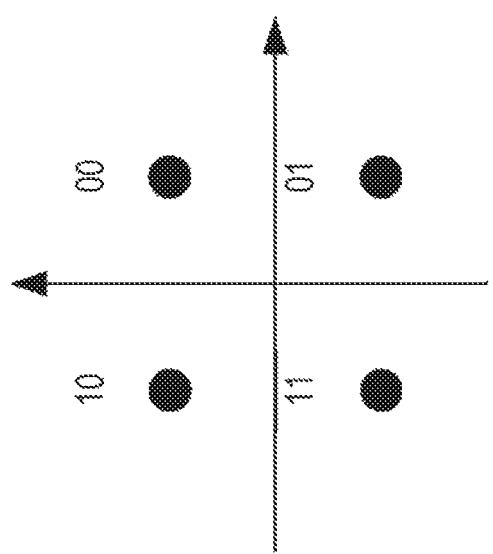
FIG. 3 is a diagram illustrating an example of second modulation mapping in compliance with QPSK according to the present embodiment.
Figure 4:
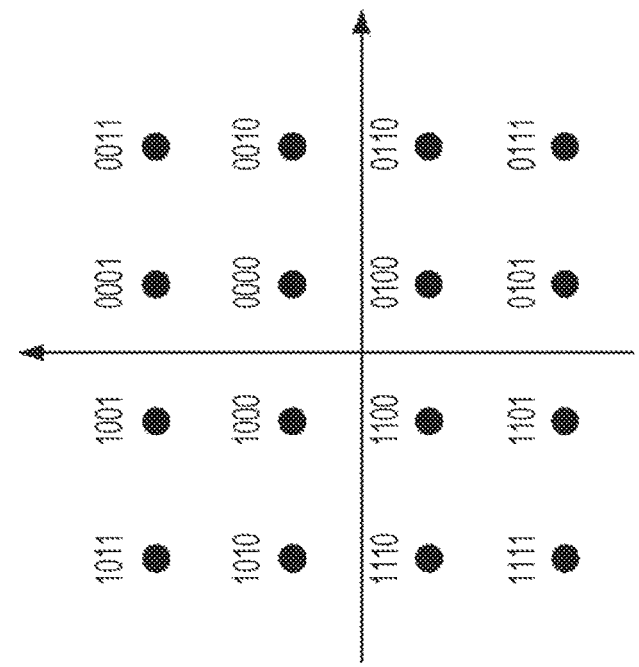
FIG. 4 is a diagram illustrating an example of the second modulation mapping in compliance with 16 QAM according to the present embodiment.
Figure 5:
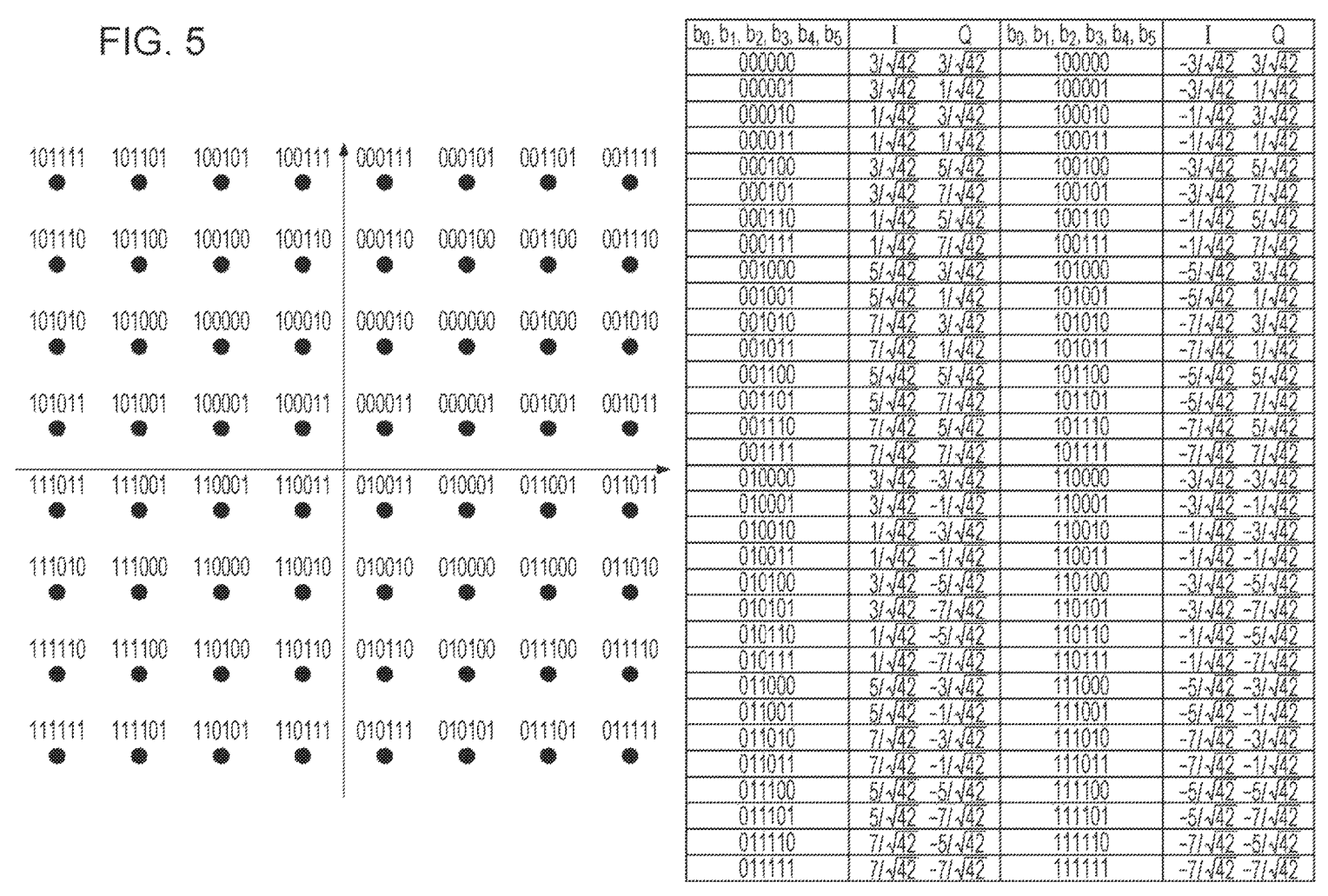

It is noted that FIG. 3 illustrates an example of the second modulation mapping in compliance with QPSK, FIG. 4 illustrates an example of the second modulation mapping in compliance with or 16 QAM, and FIG. 5 illustrates an example of the second modulation mapping in compliance with 64 QAM.

Furthermore, in the case of a predetermined downlink control information format and in the case of a downlink control information format other than the predetermined downlink control information format, the base station apparatus 1 can generate a modulation symbol based on different modulation mapping. In the case of a predetermined downlink control information format and in the case of a downlink control information format other than the predetermined downlink control information format, the terminal apparatus can perform the demodulation and/or the interference removal based on different modulation mapping. It is noted that the predetermined downlink control information format may be a DCI format dedicated for the NOMA mode, which is associated with the NOMA mode, and may be a DCI format that notifies the information relating to the NOMA using DCI format 1C or the like.

Furthermore, the base station apparatus 1 can apply a certain rule (formula) to a second modulation symbol, and can generate a first modulation symbol. For example, the base station apparatus 1 can obtain the first modulation mapping based on the second modulation symbol for another apparatus that performs the NOMA transmission, and can generate the first modulation symbol. At this time, the terminal apparatus 2 can demodulate the first modulation symbol based on the second modulation symbol for another apparatus, which is detected.

The higher layer processing unit 101 can generate information for demodulating the first modulation symbol. In order to demodulate the received first modulation symbol, the terminal apparatus 2 preferably has part or all of information relating to MCS that is allocated to the terminal apparatuses 2-1 to 2-2, information relating to a method of the first modulation mapping that is used by the base station apparatus 1, and information relating to powers (or power ratios) that are allocated to the terminal apparatuses 2-1 to 2-2. More precisely, the base station apparatus 1 preferably notifies the terminal apparatus 2 of part or all of the information relating to the MCS that is allocated to the terminal apparatuses 2-1 to 2-2, the information relating to the method of the first modulation mapping that is used by the base station apparatus 1, and the information relating to the powers that are allocated to the terminal apparatuses 2-1 to 2-2. Alternatively, the base station apparatus 1 and the terminal apparatus 2 preferably have part or all of the information relating to the MCS that is allocated to the terminal apparatuses 2-1 to 2-2, the information relating to the method of the first modulation mapping that is used by the base station apparatus 1, and the information relating to the powers that are allocated to the terminal apparatuses 2-1 to 2-2, which is in common use.

The higher layer processing unit 101 can generate the information relating to the modulation mapping. The information relating to the modulation mapping is information indicating the method of the modulation mapping that is used by the base station apparatus 1. The base station apparatus 1 can notify the terminal apparatus 2 of the information relating to the modulation mapping.

Based on information that is input from the higher layer processing unit 101, the control unit 102 generates a control signal for performing control of the transmission unit 103 and the reception unit 104. Furthermore, based on the information that is input from the higher layer processing unit 101, the control unit 102 determines the MCS. Furthermore, based on the information that is input from the higher layer processing unit 101, the control unit 102 determines the number of codewords. Furthermore, based on the information that is input from the higher layer processing unit 101, the control unit 102 determines the number of layers, an antenna port number, and a scrambling identity (a scrambling identifier).

The control unit 102 generates the Downlink Control Information, based on the information that is input from the higher layer processing unit 101, and outputs the generated Downlink Control Information to the transmission unit 103. In the case of a primary cell, the base station apparatus may include the configuration information in the higher layer in a secondary cell, in the Downlink Control Information.

The transmission unit 103 generates the Downlink Reference Signal in accordance with the control signal that is input from the control unit 102, codes and modulates the HARQ indicator, the Downlink Control Information, and the downlink data, which are input from the higher layer processing unit 101, multiplexes the PHICH, the PDCCH, the EPDCCH, the PDSCH, and the Downlink Reference Signal, and transmits the resulting signal to the terminal apparatus 2 through the transmit and receive antenna unit 105. It is noted that in a case where a second frame structure is used, the base station apparatus is made to multiplex at least the PDSCH and not to multiplex the Downlink Control Information. Furthermore, in the second frame structure, a frequency interval or a time interval of the Downlink Reference Signal can be increased much more than in a first frame structure. Furthermore, the base station apparatus can transmit control information of a signal that is allocated to the second frame structure, using the first frame structure.

The coding unit 1031 performs coding on the HARQ indicator, the Downlink Control Information, and the downlink data, which are input from the higher layer processing unit 101. When performing the coding, the coding unit 1031 uses a coding scheme that is determined in advance, such as block coding, convolutional coding, or turbo coding, or uses a coding scheme that is determined by the radio resource control unit 1011.

The modulation unit 1032 performs modulation on coding bits that are input from the coding unit 1031, using a modulation scheme that is determined in advance, such as Binary Phase Shift Keying (BPSK), quadrature Phase Shift Keying (QPSK), 16 quadrature amplitude modulation (QAM), 64 QAM, or 256 QAM, or using a modulation scheme that is determined by the radio resource control unit 1011. When it is assumed that the number of bits that are allocated to a certain resource element is N and bits are b0, and so forth up to bN−1, the second modulation symbol s that can be generated in a modulation scheme that has a higher order than QPSK or QPSK modulation scheme can be generated as expressed in Equations (1) to (3).

[Math. 1]

$$a_N = \sqrt{\frac{3}{2(2^N-1)}} \quad (1)$$

$$\text{Re}[s] = a_N \left[ \sum_{q=0}^{\frac{N}{2}-1} 2^{\frac{N}{2}-1-q}(-1)^q \prod_{q'=0}^{q}(1-2b_{2q'}) \right] \quad (2)$$

$$\text{Im}[s] = a_N \left[ \sum_{q=0}^{\frac{N}{2}-1} 2^{\frac{N}{2}-1-q}(-1)^q \prod_{q'=0}^{q}(1-2b_{2q'+1}) \right] \quad (3)$$

However, N is an even number greater than 1. Re[s] and Im[s] are a real part and an imaginary part of s, respectively. Furthermore, in a case where N=1, that is, in the case of BPSK, s=1−b0. FIG. 3 is a diagram illustrating QPSK (N=2) that can be generated with Equations (1) to (3). FIG. 4 is a diagram illustrating 16 QAM (N=4) that can be generated with Equations (1) to (3). FIG. 5 is a diagram illustrating 64 QAM (N=6) that can be generated with Equations (1) to (3).

An example of the first modulation symbol that is generated by the modulation unit 1032 is described. As will be described below, the first modulation symbol may be a modulation symbol that includes bits which are addressed to both of the terminal apparatuses 2-1 to 2-2, which are generated using the first modulation mapping and the second modulation mapping, or may be a modulation symbol that includes bits which are addressed to any one of the terminal apparatuses 2-1 to 2-2, which are generated using the first modulation mapping and the second modulation mapping. An example will be described below in which the first modulation symbol that includes composite bits is generated. It is assumed that the number of bits that are addressed to the terminal apparatus 2-1 is N1 and that the number of bits that are addressed to the terminal apparatus 2-2 is N2. It is assumed that b0, and so forth up to bN1−1 are bits that are addressed to the terminal apparatus 2-1 and that bN1 and so forth up to bN1+N2−1 are bits that are addressed to the terminal apparatus 2-2. A combination of bits that are addressed to all terminal apparatuses 2, in one resource element that is multiplexed with the NOMA, is also referred to as the composite bits. More precisely, in the case where the NOMA mode is configured and/or where the information relating to the NOMA is configured, or in a case where the modulation mapping information indicates the first modulation mapping, the base station apparatus 1 can combine bits that are addressed to the terminal apparatus 2-1 and the terminal apparatus 2-2 and thus can generate a modulation symbol. In other words, the base station apparatus 1 can transmit a composite modulation symbol that results from combining symbols for the terminal apparatus 2-1 and the terminal apparatus 2-2, to the terminal apparatus 2-2, and can transmit a modulation symbol for the terminal apparatus 2-1, to the terminal apparatus 2-1. In the case where the NOMA mode is configured and/or where the information relating to the NOMA is configured, or in a case where the modulation mapping information indicates the first modulation mapping, the terminal apparatus 2-2 can determine that some of the composite bits are bits which are addressed to the terminal apparatus 2-2 itself and the remaining bits are bits that are addressed to another apparatus, and can perform the demodulation.

For example, the first modulation symbol s can be generated with Equations (4) to (5) that follow.

[Math. 2]

$$\text{Re}[s] = \sqrt{p_1}\, a_{N_1} \left[ \sum_{q=0}^{\frac{N_1}{2}-1} 2^{\frac{N_1}{2}-1-q}(-1)^q \prod_{q'=0}^{q}(1-2b_{2q'}) \right] + \quad (4)$$

$$\sqrt{p_2}\, a_{N_2} \left[ \sum_{q=\frac{N_1}{2}}^{\frac{N_1+N_2}{2}-1} 2^{\frac{N_1+N_2}{2}-1-q}(-1)^q \prod_{q'=0}^{q}(1-2b_{2q'}) \right]$$

$$\text{Im}[s] = \sqrt{p_1}\, a_{N_1} \left[ \sum_{q=0}^{\frac{N_1}{2}-1} 2^{\frac{N_1}{2}-1-q}(-1)^q \prod_{q'=0}^{q}(1-2b_{2q'+1}) \right] + \quad (5)$$

$$\sqrt{p_2}\, a_{N_2} \left[ \sum_{q=\frac{N_1}{2}}^{\frac{N_1+N_2}{2}-1} 2^{\frac{N_1+N_2}{2}-1-q}(-1)^q \prod_{q'=0}^{q}(1-2b_{2q'+1}) \right]$$

Figure 6:
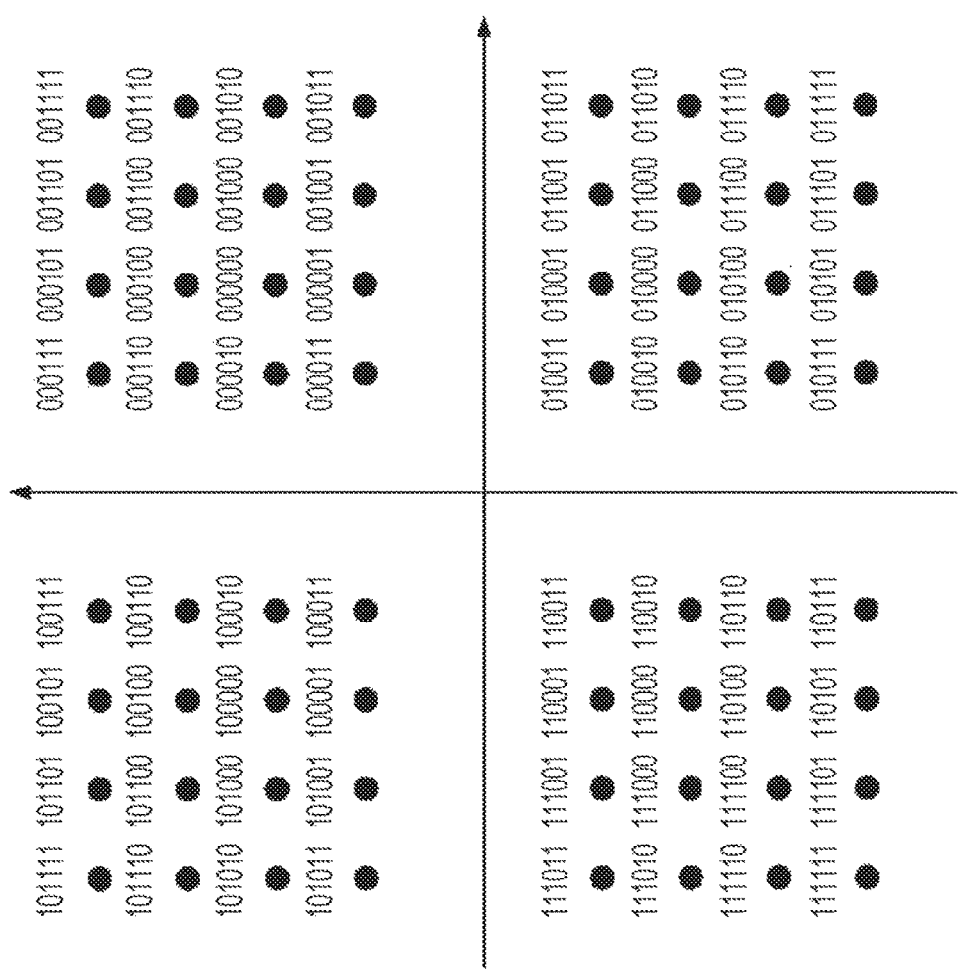
FIG. 6 is a diagram illustrating an example of first modulation mapping according to the present embodiment.

However, each of p1 and p2 indicates a power that is assigned to each of the terminal apparatus 2-1 and the terminal apparatus 2-2, a power ratio, or a power offset. It is assumed here that p1+p2=1. This generation can make possible the modulation mapping with bits as a whole, as is the case with a gray code, and the transmission performance can be improved. Furthermore, because the terminal apparatus 2-1 is a terminal apparatus that is remote from the base station apparatus, a great value is set for p1 and thus the transmission performance in the terminal apparatus 2-1 can be improved. FIG. 6 illustrates an example of the first modulation mapping that is generated using Equations (4) and (5), and is a diagram in a case where QPSK and 16 QAM are allocated to the terminal apparatus 2-1 and the terminal apparatus 2-2, respectively. Initial 2 bits are addressed to the terminal apparatus 2-1 and the remaining 4 bits are addressed to the terminal apparatus 2-2. Because the gray code results in which a certain modulation point and a modulation point in the vicinity of the certain modulation point is only at a one-bit distance away from each other, the transmission performance can be improved. Furthermore, because a comparison between FIGS. 5 and 6 shows that FIGS. 5 and 6 are the same in allocation of bits, if the modulation mapping is known, the demodulation can be performed with almost the same processing as in the case of the second modulation mapping. It is noted that the order in which bits are allocated to each terminal apparatus 2 is not limited. For example, the first bit and the fourth bits are addressed to the terminal apparatus 2-1 and the other 4 bits are addressed to the terminal apparatus 2-2, and other orders can also be set to be used.

Figure 7:
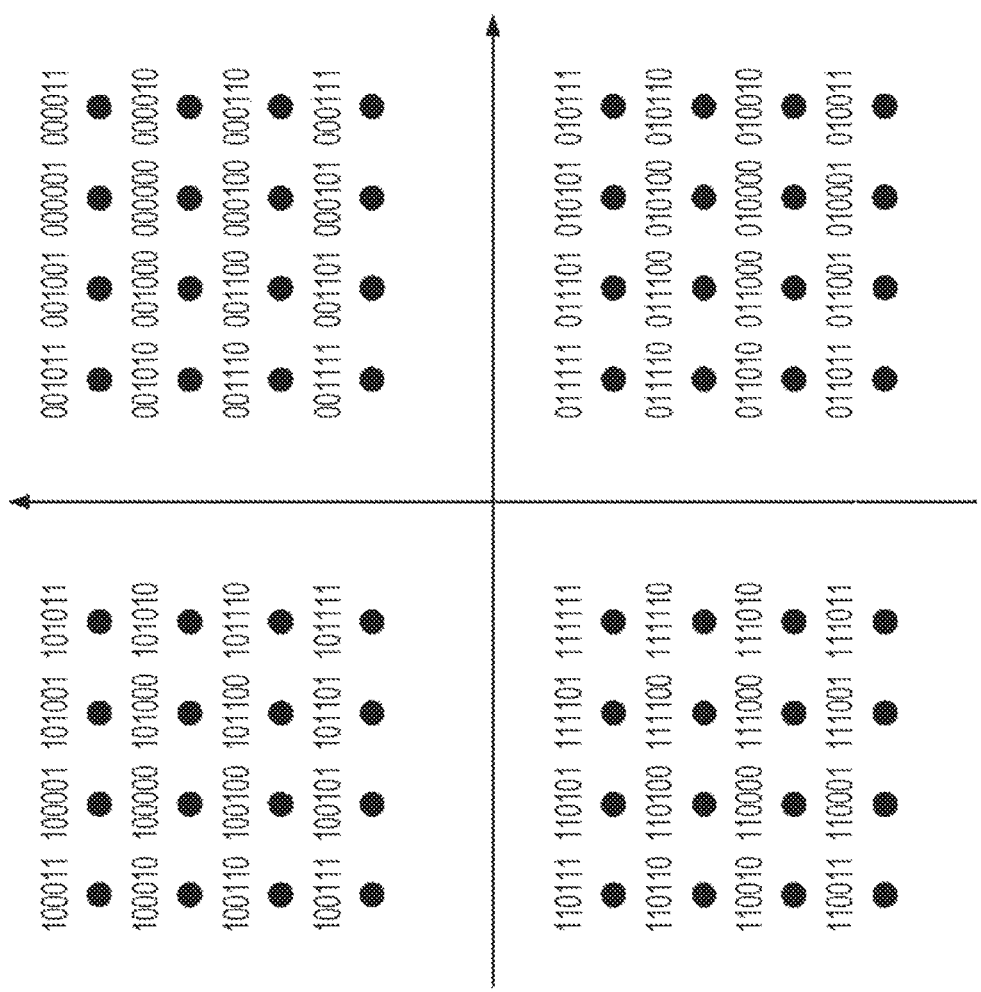
FIG. 7 is a diagram illustrating an example of the first modulation mapping according to the present embodiment.

It is noted that FIG. 7 is a diagram illustrating another example of the first modulation mapping. In FIGS. 6 and 7, different types of mapping are performed, but both also result in the gray code. For example, initial 2 bits that result from the first modulation mapping that is illustrated in FIGS. 6 and 7 indicate allocation of a QPSK modulation symbol to the terminal apparatus 2-1, but are different from each other in terms of an allocation position of the modulation symbol. In this manner, the first modulation mapping according to the present invention may be possible as long as it satisfies the attribute of the gray code, and a plurality of types of first modulation mapping are present.

A method in which the modulation unit 1032 generates the first modulation symbol for the NOMA transmission is not limited to the methods that are based on Equations (4) and (5). Another method in which the modulation unit 1032 generates the first modulation symbol for the NOMA transmission will be described below.

As an example, a case will be described below where, in the case of the NOMA transmission, the base station apparatus 1 allocates QPSK to the terminal apparatus 2-1 and allocates 16 QAM to the terminal apparatus 2-2. First, it is assumed that the modulation unit 1032 performs multiplexing on each of the QPSK modulation points that are transmitted to the terminal apparatus 2-1, which are illustrated in FIG. 3, and on 16 QAM modulation points for the terminal apparatus 2-2, which are illustrated in FIG. 4, and generates a modulation symbol 1032a. The modulation symbol 1032a that is generated by the modulation unit 1032 has the same constitution as the modulation symbol that is illustrated in FIG. 5.

When it comes to the modulation symbol 1032a, bit allocation to the neighboring modulation symbol point does not satisfy a requirement for the gray code (All Humming distances at the neighboring modulation symbol point are not 1). The modulation unit 1032 performs different operations on four quadrants of the modulation symbol 1032a, and thus can generate a modulation symbol that satisfies the requirement for the gray code. For example, the modulation unit 1032 performs point symmetry moving on the first quadrant (for example, the upper right quadrant), with the middle of 16 modulation points in the first quadrant as a reference, and thus can obtain a modulation symbol constitution in which the modulation point (001111) is the closest to the middle. In the same manner, the modulation unit 1032 performs the point symmetry moving, with the middle of 16 modulation point in each of the quadrants as a reference, and thus generates a modulation symbol 1032b. In another method, for the terminal apparatus 2-2, the base station apparatus 1 can generate the first modulation symbol that is based on the modulation scheme (more precisely, the second modulation mapping) for the terminal apparatus 2-1. First, among modulation symbol points for the terminal apparatus 2-1, one modulation symbol point is set to be a reference symbol point. At this point, because QPSK is used for the terminal apparatus 2-1, for example, the reference symbol point is set to be (00). The reference symbol point and the modulation symbol that is transmitted to the terminal apparatus 2-1 are exclusive-ORed for every bit. For example, in a case where the modulation point that is transmitted to the terminal apparatus 2-1 is (10), the result of the exclusive-ORing for every bit is (10). It is noted that the reference symbol point is set to (00) in the case of QPSK, the modulation symbol point that is transmitted is exclusive-ORed, it is not desirable to perform exclusive-ORing calculation. If bits at the second modulation symbol point that corresponds to bits that are a result 1 of the exclusive-ORing are inverted, the result is a first modulation symbol point. For example, the result of the exclusive-ORing is set to be (10). In an example in FIG. 4, in 16 QAM, because the first and second bits correspond to QPSK, the first bit in 16 QAM is inverted with the result (10) of the exclusive-ORing. A combination of a QPSK symbol point and a 16 QAM symbol point that results from the bit inversion results in a composite modulation symbol point. When these operations are performed with all symbol points, the result is as illustrated in FIG. 7, the modulation symbol 1032b can satisfy the requirement for the gray code.

The base station apparatus 1 can transmit a signal indicating that the NOMA is performed on the terminal apparatus 2-2 and/or that the interference removal or suppression is needed. The base station apparatus 1 can notify the terminal apparatus 2-2 of both of p1 and p2, any one of p1 and p2, or a ratio (an offset) between p1 and p2. The terminal apparatus 2-2 receives the signal indicating that the NOMA is performed and/or that the interference removal or suppression is needed, from the base station apparatus 1, and can suitably demodulate bits that are addressed to the terminal apparatus 2-2 itself, based on the signal.

A downlink reference signal generating unit 1033 generates as the Downlink Reference Signal a sequence that is already known to the terminal apparatus 2, which is obtained according to a rule that is determined in advance based on a physical cell identity (PCI) or the like for identifying the base station apparatus 1. Furthermore, the downlink reference signal generating unit 1033 can generate the UE-specific Reference Signal based on the scrambling identity. The downlink reference signal generating unit 1033 can generate different UE-specific Reference Signals that are used for the terminal apparatus 2-1 and the terminal apparatus 2-2. At that time, the UE-specific reference signal to the terminal apparatus 2-1 can be multiplied by a square root of p1. Accordingly, although the terminal apparatus 2-1 does not know p1, the terminal apparatus 2-1 can demodulate the bits that are addressed to the terminal apparatus 2-1 itself. Furthermore, the UE-specific reference signal to the terminal apparatus 2-2 can be multiplied by a square root of p2. Accordingly, the terminal apparatus 2-2 can measure a power of the UE-specific Reference Signal. The terminal apparatus 2-2, when detecting a lower power than normal, can determine that the NOMA transmission is performed. In such a case, the terminal apparatus 2-2 can demodulate bits that are addressed to the terminal apparatus 2-2 itself based on the modulation symbol that is generated with Equations (4) to (5).

It is noted that the base station apparatus 1 may set any one of p1 and p2 to 0, and may transmit information to that effect to the terminal apparatus 2, and thus may instantly provide a notice that the NOMA is not performed. In a case where p1 is set to 0, the base station apparatus 1 can generate a modulation symbol based on the second modulation mapping. In this case, even in a case where the NOMA mode is configured and/or even in case where the information relating to the NOMA is configured, the terminal apparatus 2, if the terminal apparatus 2 receives a notice that an interference power is 0 or detects that the interference power is 0, the terminal apparatus 2 does not perform the remove or suppression of the interference signal. Furthermore, even in a case where the terminal apparatus 2-2 receives the information indicating the first modulation mapping, if the terminal apparatus 2-2 receives the notice that the interference power is 0 or detects that the interference power is 0, the terminal apparatus 2-2 can perform the demodulation based on the second modulation mapping.

In a case where the downlink reference signal generating unit 1033 transmits the same UE-specific Reference Signal that is used for the terminal apparatuses 2-1 and 2-2 that perform the NOMA, the base station apparatus 1 can notify the terminal apparatus 2-1 of both of p1 and p2 or any one of p1 and p2. Accordingly, the terminal apparatus 2-1 can suitably demodulate bits that are addressed to the terminal apparatus 2-1 itself.

A multiplexing unit 1034 multiplexes a modulation symbol of each channel, which results from the modulation, and the Downlink Reference Signal and the Downlink Control Information, which are generated. More precisely, the multiplexing unit 1034 maps the modulation symbol of each channel, which results from the modulation, and the Downlink Reference Signal and the Downlink Control Information, which are generated, to resource elements.

The wireless transmission unit 1035 performs Inverse Fast Fourier Transform (IFFT) on a modulation symbol and the like that result from the multiplexing, performs modulation in compliance with an OFDM scheme, attaches a Cyclic Prefix (CP) to the OFDM symbol that results from the OFDM modulation, and generates a digital signal in a baseband. The wireless transmission unit 1035 converts the generated digital signal in the baseband into an analog signal in a desired band, using filtering, Digital-to-Analog (DA) conversion, frequency conversion, power amplification, and the like. The wireless transmission unit 1035 outputs the generated analog signal to a transmit and receive antenna 105 for transmission.

In accordance with the control signal that is input from the control unit 102, the reception unit 104 outputs information, which results from demultiplexing, demodulating, and decoding a reception signal that is received from the terminal apparatus 2 through the transmit and receive antenna 105, to the higher layer processing unit 101.

A wireless reception unit 1041 converts an uplink signal that is received from the transmit and receive antenna 105 into a digital signal in the baseband, using the frequency conversion, the filtering, the Analog-to-Digital (AD) conversion, amplitude control, and the like.

The wireless reception unit 1041 removes a portion that is equivalent to the CP from the digital signal that results from the conversion. The wireless reception unit 1041 performs Fast Fourier Transform (FFT) on the signal from which the CP is removed, extracts a signal in the frequency domain, and outputs the extracted signal to the demultiplexing unit 1042.

The demultiplexing unit 1042 demultiplexes the signal that is input from the wireless reception unit 1041 into the PUCCH, the PUSCH, and the signal such as the Uplink Reference Signal. It is noted that, the demultiplexing is performed based on radio resource allocation information that is determined in advance by the base station apparatus 1, using the radio resource control unit 1011, and that is included in the uplink grant that is notified to each of the terminal apparatuses 2.

Furthermore, the demultiplexing unit 1042 performs channel compensation on the PUCCH and the PUSCH. Furthermore, the demultiplexing unit 1042 demultiplexes the Uplink Reference Signal.

A demodulation unit 1043 performs Inverse Discrete Fourier Transform (IDFT) on the PUSCH, acquires the modulation symbol, and performs reception signal demodulation on each of the modulation symbols on the PUCCH and the PUSCH, using the modulation scheme that is determined in advance, such as BPSK, QPSK, 16 QAM, 64 QAM, or 256 QAM, or using the modulation scheme that is notified, in advance, with the uplink grant, to each terminal apparatus 2 by the base station apparatus 1 itself. It is noted that the Inverse Discrete Fourier Transform may be the Inverse Fast Fourier Transform in accordance with the number of subcarriers on the PUSCH.

A decoding unit 1044 performs the decoding on coding bits of the PUCCH and the PUSCH that result from the demodulation, at a coding rate in compliance with the coding scheme that is determined in advance, which is determined in advance, or at a coding rate which is notified in advance with the uplink grant to the terminal apparatus 2 by the base station apparatus itself, and outputs the uplink data and the Uplink Control Information that result from the decoding, to the higher layer processing unit 101. In the case of retransmission of the PUSCH, the decoding unit 1044 performs the decoding using the coding bits that are input from the higher layer processing unit 101 and that are retained in an HARQ buffer, and the coding bits that result from the demodulation.

Figure 8:
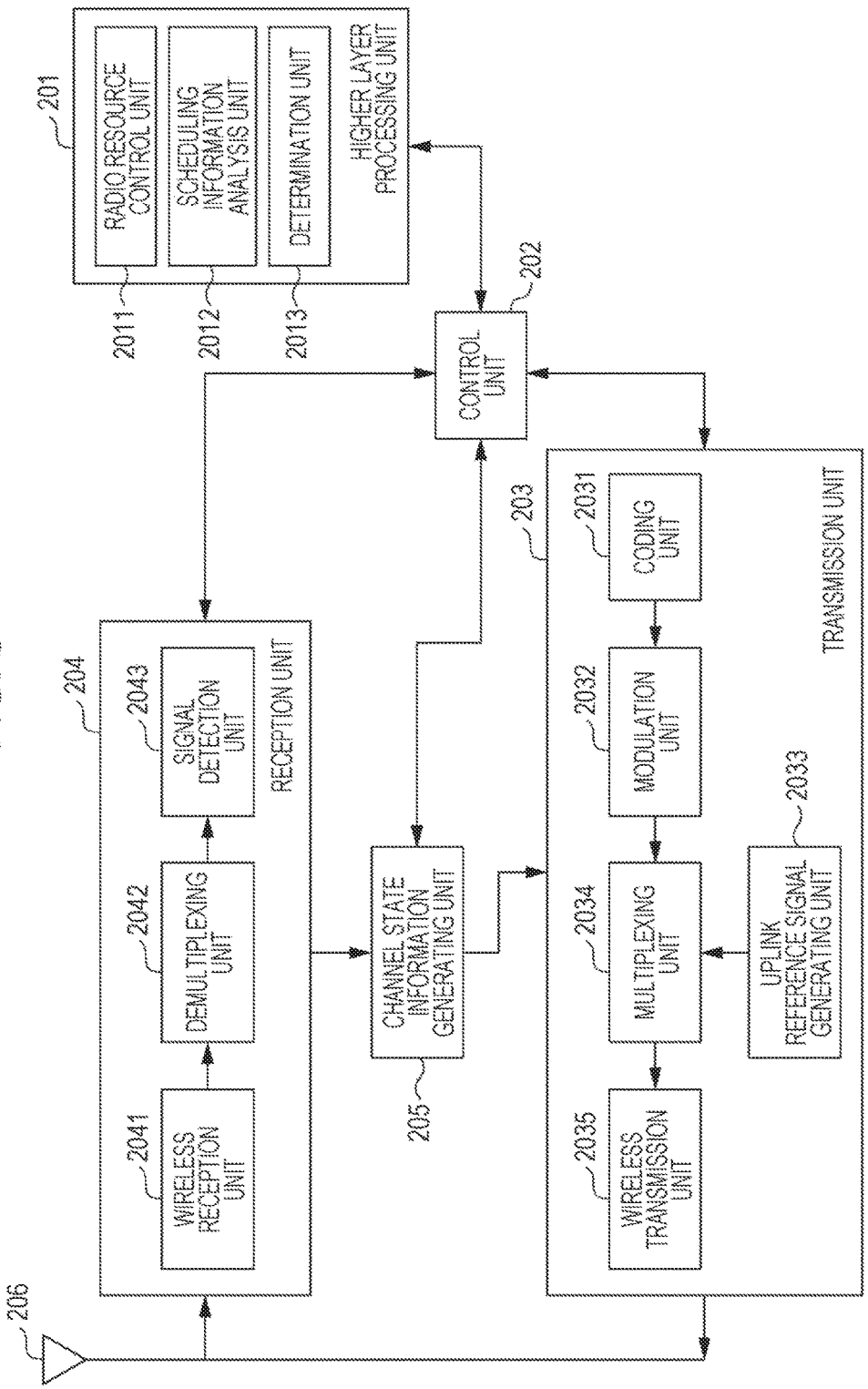
FIG. 8 is a schematic block diagram illustrating a configuration of a terminal apparatus according to the present embodiment.

FIG. 8 is a schematic block diagram illustrating a constitution of the terminal apparatus according to the present embodiment. As illustrated in FIG. 8, the terminal apparatus is constituted to include a higher layer processing unit (a higher layer processing step) 201, a control unit (a control step) 202, a transmission unit (a transmission step) 203, a reception unit (a reception step) 204, a channel state information generating unit (a channel state information generating step) 205, and a transmit and receive antenna 206. Furthermore, the higher layer processing unit 201 is constituted to include a radio resource control unit (a radio resource control step) 2011 and a scheduling information analysis unit (a scheduling information analysis step) 2012. Furthermore, the transmission unit 203 is constituted to include a coding unit (a coding step) 2031, a modulation unit (a modulation step) 2032, an uplink reference signal generating unit (an uplink reference signal generating step) 2033, a multiplexing unit (a multiplexing step) 2034, and a wireless transmission unit (a wireless transmission step) 2035. Furthermore, the reception unit 204 is constituted to include a wireless reception unit (a wireless reception step) 2041, a demultiplexing unit (a demultiplexing step) 2042, and a signal detection unit (a signal detection step) 2043.

The higher layer processing unit 201 outputs the uplink data (the Transport Block) that is generated by a user operation and the like, to the transmission unit 203. Furthermore, the higher layer processing unit 201 performs the processing of the Medium Access Control (MAC) layer, the Packet Data Convergence Protocol (PDCP) layer, the Radio Link Control (RLC) layer, and the Radio Resource Control (RRC) layer.

The higher layer processing unit 201 outputs information indicating the function of the terminal apparatus, which is supported by the terminal apparatus itself, to the transmission unit 203.

The higher layer processing unit 201 can refer to the information relating to the NOMA mode, and the terminal apparatus 2 can cause the NOMA to be configured or can cause a mode other than the NOMA to be configured.

The higher layer processing unit 201 has a function of determining which modulation mapping the terminal apparatus 2 uses to perform the demodulation. For example, the terminal apparatus 2 for which the NOMA is configured refers to the information relating to the MCS that is allocated to the terminal apparatuses 2-1 to 2-2. In a case where the MCS of the terminal apparatus 2 is at a high level, the terminal apparatus 2 can be configured in such a manner that the demodulation is performed based on the first modulation mapping. In a case where the MCS of the terminal apparatus 2 is at a low level, the terminal apparatus 2 can be configured in such a manner that the demodulation is performed based on the second modulation mapping.

Furthermore, in another method, the terminal apparatus 2 for which the NOMA is configured refers to the information relating to the power that is allocated to the terminal apparatuses 2-1 to 2-2. In a case where the power of the terminal apparatus 2 is high, the terminal apparatus 2 can be configured in such a manner that the demodulation is performed based on the first modulation mapping. In a case where the power of the terminal apparatus 2 is low, the terminal apparatus 2 can be configured in such a manner that the demodulation is performed based on the second modulation mapping.

Furthermore, in another method, the terminal apparatus 2 for which the NOMA is configured refers to information relating to a mapping method. In a case where the base station apparatus 1 uses the first modulation mapping, the terminal apparatus 2 can be configured in such a manner that the modulation is performed based on the first modulation mapping. In a case where the base station apparatus 1 uses the second modulation mapping, the terminal apparatus 2 can be configured in a such a manner that the modulation is performed based on the second modulation mapping.

Furthermore, in another method, the terminal apparatus 2 for which the NOMA is configured can be configured in such a manner that the demodulation is performed based on the first modulation mapping.

Furthermore, in another method, the terminal apparatus 2 for which the NOMA is configured acquires values of p1 and p2 that are information relating to the power that is allocated to the terminal apparatus 2 itself and to the power that is allocated to the terminal apparatuses that are NOMA-multiplexed. In a case where the power that is allocated to the terminal apparatus itself is low, the terminal apparatus 2 can be configured in such a manner that the demodulation is performed using the first modulation mapping. In a case where the power that is allocated to the terminal apparatus 2 itself is high, the terminal apparatus can be configured in such a manner that the demodulation is performed using the second modulation mapping.

Furthermore, in another method, the terminal apparatus 2 for which the NOMA is configured can be configured in such a manner that the demodulation is performed using the first modulation mapping, in a case where the terminal apparatus 2 is configured by the base station apparatus 1 to decode the DCI format for the NOMA (or in a case where the terminal apparatus 2 is configured to demodulate the DCI that has bits of which the number corresponds to the DCI format for the NOMA), and can be configured in such a manner that the demodulation is performed using the second modulation mapping, in a case where the terminal apparatus 2 is configured by the base station apparatus 1 to decode a DCI format other than the DCI format dedicated to the NOMA.

Furthermore, in another method, the terminal apparatus 2 for which the NOMA is configured can be configured in such a manner that the demodulation is performed using the first modulation mapping due to the DCI or the second modulation mapping.

The radio resource control unit 2011 manages various pieces of configuration information of the terminal apparatus itself. Furthermore, the radio resource control unit 2011 generates information that is mapped to each channel in the uplink and outputs the generated information to the transmission unit 203.

Furthermore, the radio resource control unit 2011 can acquire the information relating to the NOMA mode, which is obtained from the base station apparatus 1, and can output the acquired information to a determination unit 2013.

The scheduling information analysis unit 2012 interprets the Downlink Control Information that is received through the reception unit 204 and determines scheduling information. The scheduling information analysis unit 2012 can determine whether or not the NOMA is performed with a resource element for the terminal apparatus itself. Furthermore, the scheduling information analysis unit 2012 generates the control information in order to perform the control of the reception unit 204 and the transmission unit 203 based on the scheduling information, and outputs the generated control information to the control unit 202.

Based on the information that is input from the higher layer processing unit 201, the control unit 202 generates a control signal for performing the control of the reception unit 204 and the transmission unit 203. The control unit 202 outputs the generated control signal to the reception unit 204 and the transmission unit 203 and performs the control of the reception unit 204 and the transmission unit 203. The control unit 202 outputs the Uplink Control Information that includes terminal information and the like, and the uplink data, to the transmission unit 203. At this point, the terminal information includes information indicating whether or not the terminal apparatus has a function of demodulating a NOMA signal.

Furthermore, the scheduling information analysis unit 2012 can acquire the information relating to the NOMA mode, which is transmitted by the base station apparatus 1, and can output the acquired information to the determination unit 2013.

In a case where in a radio resource to which the terminal apparatus 2 itself is allocated, other terminal apparatuses are allocated in an overlapping manner, the scheduling information analysis unit 2012 can determine that the base station apparatus 1 performs the NOMA transmission of the radio resource, and can output information indicating that the NOMA transmission is performed, as the information relating to the NOMA mode, to the determination unit 2013.

The determination unit 2013 acquires the information relating to the NOMA mode, which is output by the radio resource control unit 2011 or the scheduling interpretation unit 2012. Based on the acquired information relating to the NOMA mode, the determination unit 2013 determines whether or not the base station apparatus 1 transmits the PDSCH using the NOMA transmission (information that results from the determination is hereinafter also referred to as NOMA determination information). The determination unit 2013 can output the NOMA determination information to the reception unit 204.

For example, the terminal apparatus 2 can determine whether or not the PDSCH is demodulated as the NOMA signal using the NOMA determination information. In addition, for example, the NOMA determination information can also be one-bit information indicating whether or not the base station apparatus 1 performs the NOMA transmission. The NOMA determination information, for example, may be configured for every set of resources. Additionally, the DCI in the NOMA mode is notified by the base station apparatus to the terminal apparatus, but in a case where the DCI is detected in a UE-specific search space, the determination unit can determine that the NOMA signal is transmitted, and can perform signal detection on the PDSCH that is designated by the DCI.

Furthermore, processing in which the terminal apparatus 2 that demodulates the PDSCH as the NOMA signal includes removing (canceling or suppressing) a signal (which is hereinafter also referred to as the interference signal) that is transmitted to another terminal apparatus. Methods in which the terminal apparatus 2 removes the interference signal, for example, include Symbol Level Interference Cancellation (SLIC) that performs the interference removal according to a result of the demodulation of the interference signal, Code word Level Interference Cancellation (CWIC) that performs the interference removal according to a result of the decoding of the interference signal, Maximum Likelihood Detection (MLD) that searches for the most similar one among transmission signal candidates, and the like.

The control unit 202 controls the transmission unit 203 in such a manner that the CSI which is generated by the channel state information generating unit 205 is transmitted to the base station apparatus.

In accordance with the control signal that is input from the control unit 202, the reception unit 204 outputs information, which results from demultiplexing, demodulating, and decoding a reception signal that is received from the base station apparatus through the transmit and receive antenna 206, to the higher layer processing unit 201.

The wireless reception unit 2041 converts a downlink signal that is received through the transmit and receive antenna 206 into a digital signal in the baseband, using the frequency conversion, the filtering, the AD conversion, the amplitude control, and the like.

Furthermore, the wireless reception unit 2041 removes a portion that is equivalent to the CP from the digital signal that results from the conversion, performs the Fast Fourier Transform on the signal from which the CP is removed, and extracts a signal in the frequency domain.

The demultiplexing unit 2042 demultiplexes a signal that results from the extraction, into the PHICH, the PDCCH, the EPDCCH, the PDSCH, and/or the Downlink Reference Signal. Furthermore, the demultiplexing unit 2042 performs channel compensation on the PHICH, the PDCCH, and the EPDCCH based on a channel estimate of a desired signal that is acquired from channel measurement, detects the Downlink Control Information, and outputs the detected Downlink Control Information to the control unit 202. It is noted that in a case where the reception signal is a signal that is transmitted using the second frame structure, if the Downlink Control Information is not transmitted in the second frame structure, the demultiplexing unit 2042 does not perform detection of the Downlink Control Information. Furthermore, the control unit 202 outputs the PDSCH and a channel estimate of the desired signal to the signal detection unit 2043. It is noted that channel estimation is performed based on the number of layers for the terminal apparatus itself, the antenna port number, and the scrambling identity, which are input from the control unit 202.

The signal detection unit 2043 detects the downlink data (the Transport Block), using the PDSCH and the channel estimate, and outputs a result of the detection to the higher layer processing unit 201.

A case where the terminal apparatus 2-1 demodulates the NOMA signal is described. In a case where both of powers p1 and p2, or any one of powers p1 and p2 is notified, the signal detection can be performed based on p1. In a case where the UE-specific reference signal (or the CRS) is multiplied by a square root of p1 without powers p1 and p2 being notified, the signal detection performs using the channel estimate that is calculated using the UE-specific reference signal (or the CRS), and thus bits that are addressed to the terminal apparatus 2-1 itself can be demodulated.

A case where the terminal apparatus 2-2 demodulates the NOMA signal is described. In the case where both of powers p1 and p2, or any one of powers p1 and p2 is notified, the signal detection can be performed based on p1 and p2. On this occasion, with Equations (4) and (5), it can be determined that the modulation symbol is generated. Alternatively, in a case where the modulation symbol as illustrated in FIG. 7 is employed, the signal detection can be performed based on this. In a case where the UE-specific reference signal is multiplied by a square root of p2 without powers p1 and p2 being notified, the power of the UE-specific reference signal is measured, and thus it can be determined whether or not the NOMA is performed. Furthermore, the terminal apparatus 2-2 can calculate p1 and p2. Based on p1 and p2, the terminal apparatus 2-2 can demodulate bits that are addressed to the terminal apparatus 2-2 itself. It is noted that NOMA demodulation by the terminal apparatus 2-2, for example, can first detect bits that are addressed to the terminal apparatus 2-1 itself, can subtract a reception signal replica that can be generated from the bits that are addressed to the terminal apparatus 2-1, from the reception signal that uses resource elements involved, and can demodulate bits that are addressed to the terminal apparatus 2-2 itself, from the reception signal that results from performing the substration.

It is noted that processing by the signal detection unit 2043 in a case where both of powers p1 and p2 are not notified is described. In this case, the processing by the signal detection unit 2043 varies according to the NOMA determination information. Based on the NOMA determination information, the signal detection unit 2043 can determine whether or not the demodulation of the NOMA signal is to be performed.

A case in which the signal processing unit 2043 determines that the demodulation of the NOMA signal is not to be performed (for example, the terminal apparatus 2-1) is described. The signal processing unit 2043 calculates the channel estimate using the reference signal (for example, the URS, the CRS, the CSI-RS, or the like) in the terminal apparatus 2-1, which is transmitted by the base station apparatus 1. Using the calculated channel estimate, the signal processing unit 2043 can perform channel compensation of the Transport Block that is allocated to the terminal apparatus, and can demodulate the information.

A case in which the signal detection unit 2043 determines that the NOMA signal is to be demodulated (for example, the terminal apparatus 2-2) is described. The NOMA signal that is transmitted by the base station apparatus 1 includes the interference signal (the PDSCH for the terminal apparatus 2-1). In a case where it is determined that the demodulation of the NOMA signal is to be performed, the signal detection unit 2043 performs the demodulation of the NOMA signal, recognizing that the base station apparatus 1, for example, uses a method (the modulation mapping) of labeling the modulation symbol that is illustrated in FIG. 7. In the method (the modulation mapping) of labeling the modulation symbol that is illustrated in FIGS. 6 and 7, because neighboring symbols are necessarily different only by one bit in size from each other in a bit sequence, the gray code can be maintained with bits as a whole, leading to an improvement in the transmission performance.

The transmission unit 203 generates the Uplink Reference Signal in accordance with the control signal, which is input from the control unit 202, performs the coding and the modulation on the uplink data (the Transport Block), which is input from the higher layer processing unit 201, multiplexes the PUCCH, the PUSCH, and the generated Uplink Reference Signal, and transmits a result of the multiplexing to the base station apparatus through the transmit and receive antenna 206.

The coding unit 2031 performs the coding, such as the convolutional coding or the block coding, on the Uplink Control Information that is input from the higher layer processing unit 201. Furthermore, the coding unit 2031 performs the turbo coding, based on information that is used for scheduling of the PUSCH.

The modulation unit 2032 performs the modulation on coding bits, which are input from the coding unit 2031, in compliance with a modulation scheme that is notified with the Downlink Control Information, such as BPSK, QPSK, 16 QAM, or 64 QAM, or in compliance with a modulation scheme that is determined in advance for every channel.

The uplink reference signal generating unit 2033 generates a sequence that is obtained according to a rule (formula) which is determined in advance, based on the physical cell identity (PCI) (also referred to as a Cell ID or the like) for identifying the base station apparatus 1, a bandwidth to which the Uplink Reference Signal is mapped, a cyclic shift that is notified with the uplink grant, a parameter value for generation of a DMRS sequence, and the like.

In accordance with the control signal that is input from the control unit 202, the multiplexing unit 2034 re-maps the modulation symbols on the PUSCH in parallel and then performs Discrete Fourier Transform (DFT) on the re-mapped modulation symbols. Furthermore, the multiplexing unit 2034 multiplexes PUCCH and PUSCH signals and the generated Uplink Reference Signal for every transmit antenna port. More precisely, the multiplexing unit 2034 maps the PUCCH and PUSCH signals and the generated Uplink Reference Signal to resource elements for every transmit antenna port. It is noted that the Discrete Fourier Transform may be the Fast Fourier Transform in accordance with the number of subcarriers on the PUCCH or the PUSCH.

The wireless transmission unit 2035 performs the Inverse Fast Fourier Transform on the signal that results from the multiplexing, performs modulation in compliance with an SC-FDMA scheme, generates an SC-FDMA symbol, attaches a CP to the generated SC-FDMA symbol, and generates a digital signal in a baseband. The wireless transmission unit 2035 converts the generated digital signal in the baseband into an analog signal in a desired band, using the filtering, the DA conversion, the frequency conversion, the power amplification, and the like. The wireless transmission unit 2035 outputs the generated analog signal to the transmit and receive antenna 206 for transmission.

By performing the processing as described above, the transmission performance can be improved and throughput can be improved.

It is noted that a program running on the base station apparatus and the terminal apparatus according to the present invention is a program (a program for causing a computer to perform functions) that controls a CPU and the like in such a manner as to realize the functions according to the embodiments of the present invention, which are described above. Then, information that is handled in these apparatuses are temporarily accumulated in a RAM while being processed. Thereafter, the information is stored in various ROMs or HDDs, and if need arises, is read by the CPU to be modified or written. Of a semiconductor medium (for example, a ROM, a nonvolatile memory card, or the like), an optical storage medium (for example, a DVD, a MO, a MD, a CD, a BD, or the like), a magnetic recording medium (for example, a magnetic tape, a flexible disk, or the like), and the like, any one may be possible as a recording medium on which to store the program. Furthermore, in some cases, the functions according to the embodiments, which are described above, are realized by executing the loaded program, and in addition, the functions according to the present invention are realized by performing processing in conjunction with an operating system, other application programs, or the like, based on an instruction from the program.

Furthermore, in a case where the programs are distributed on the market, the programs, each of which is stored on a portable recording medium, can be distributed, or can be transferred to a server computer that is connected through a network such as the Internet. In this case, a storage device of the server computer also falls within the scope of the present invention. Furthermore, some or all of the portions of each of the terminal apparatus and the base station apparatus according to the embodiments, which are described above, may be realized as an LSI that is a typical integrated circuit. Each functional block of a reception apparatus may be individually built into a chip, and one or several of, or all of the functional blocks may be integrated into a chip. In a case where each of the functional blocks is integrated into a circuit, an integrated circuit control unit is added that controls the functional blocks.

Furthermore, a technique for the integrated circuit is not limited to the LSI, and an integrated circuit for the functional block may be realized as a dedicated circuit or a general-purpose processor. Furthermore, if, with advances in semiconductor technology, a circuit integration technology for a circuit with which an LSI is replaced will appear, it is also possible that an integrated circuit to which such a technology applies is used.

It is noted that the invention in the present application is not limited to the embodiments described above. Furthermore, application of the terminal apparatus according to the invention in the present application is not limited to a mobile station apparatus. It goes without saying that the terminal apparatus can be applied to a stationary-type electronic apparatus that is installed indoors or outdoors, or a non-movable-type electronic apparatus, for example, an AV apparatus, a kitchen apparatus, a cleaning or washing machine, an air conditioner, office equipment, a vending machine, and other household apparatuses.

The embodiments of the present embodiment are described in detail above with reference to the drawings, but specific configurations are not limited to the embodiments. A design and the like within the scope not departing from the gist of the present invention also fall within the scope of the claims.

INDUSTRIAL APPLICABILITY

The present invention is suitable for using a terminal apparatus, a base station apparatus, and a communication method.

It is noted that, the present international application claims the benefits of Japanese Patent Application No. 2015-036035 filed on Feb. 26, 2015, and the entire contents of Japanese Patent Application No. 2015-036035 are incorporated herein by reference.

REFERENCE SIGNS LIST 1, 1-1, 2-1 BASE STATION APPARATUS
2, 2-1, 2-2 TERMINAL APPARATUS
1-1 COVERAGE
101 HIGHER LAYER PROCESSING UNIT
102 CONTROL UNIT
103 TRANSMISSION UNIT
104 RECEPTION UNIT
105 TRANSMIT AND RECEIVE ANTENNA
1011 RADIO RESOURCE CONTROL UNIT
1012 SCHEDULING UNIT

1031 CODING UNIT
1032 MODULATION UNIT
1033 DOWNLINK REFERENCE SIGNAL GENERATING UNIT
1034 MULTIPLEXING UNIT
1035 WIRELESS TRANSMISSION UNIT
1041 WIRELESS RECEPTION UNIT
1042 DEMULTIPLEXING UNIT
1043 DEMODULATION UNIT
1044 DECODING UNIT
201 HIGHER LAYER PROCESSING UNIT
202 CONTROL UNIT
203 TRANSMISSION UNIT
204 RECEPTION UNIT
205 CHANNEL STATE INFORMATION GENERATING UNIT
206 TRANSMIT AND RECEIVE ANTENNA
2011 RADIO RESOURCE CONTROL UNIT
2012 SCHEDULING INFORMATION ANALYSIS UNIT
2013 DETERMINATION UNIT
2031 CODING UNIT
2032 MODULATION UNIT
2033 UPLINK REFERENCE SIGNAL GENERATING UNIT
2034 MULTIPLEXING UNIT
2035 WIRELESS TRANSMISSION UNIT
2041 WIRELESS RECEPTION UNIT
2042 DEMULTIPLEXING UNIT
2043 SIGNAL DETECTION UNIT

The invention claimed is:

1. A base station apparatus configured to communicate with a terminal apparatus, the base station apparatus comprising:
transmission circuitry configured to transmit downlink data by using a physical downlink shared channel (PDSCH) and downlink control information (DCI) through a physical downlink control channel (PDCCH); and
modulation circuitry configured to modulate encoded bits in the PDSCH by using a first modulation mapping or a second modulation mapping and produce modulation symbols, wherein
in a case that the DCI is defined in a prescribed DCI format,
the first modulation mapping is used for modulating the encoded bits, and
the modulation symbols are given based on at least a plurality of bits, the plurality of bits being independent of the encoded bits.

2. The base station apparatus according to claim 1, wherein
the prescribed DCI format is used in a prescribed transmission mode.

3. The base station apparatus according to claim 1, wherein
in a case that the second modulation mapping is used,
the modulation symbols include at least first modulation symbols, second modulation symbols, third modulation symbols, or fourth modulation symbols, where each of the first modulation symbols has real-part value of $1/\sqrt{2}$ and imaginary-part value of $1/\sqrt{2}$ for '00' included in the encoded bits,
each of the second modulation symbols has real-part value of $1/\sqrt{2}$ and imaginary-part value of $-1/\sqrt{2}$ for '01' included in the encoded bits,
each of the third modulation symbols has real-part value of $-1/\sqrt{2}$ and imaginary-part value of $1/\sqrt{2}$ for '10' included in the encoded bits, and
each of the fourth modulation symbols has real-part value of $-1/\sqrt{2}$ and imaginary-part value of $-1/\sqrt{2}$ for '11' included in the encoded bits.

4. A communication method for a base station apparatus configured to communicate with a terminal apparatus, the communication method comprising steps of:
transmitting downlink data by using a physical downlink shared channel (PDSCH) and downlink control information (DCI) through a physical downlink control channel (PDCCH),
modulating encoded bits in the PDSCH by using a first modulation mapping or a second modulation mapping, and
producing modulation symbols, wherein
in a case that the DCI is defined in a prescribed DCI format,
the first modulation mapping is used for modulating the encoded bits, and
the modulation symbols are given based on at least a plurality of bits, the plurality of bits being independent of the encoded bits.

5. A terminal apparatus configured to communicate with a base station apparatus, the terminal apparatus comprising:
reception circuitry configured to receive downlink data carried in a physical downlink shared channel (PDSCH) and downlink control information (DCI) through a physical downlink control channel (PDCCH); and
signal detection circuitry configured to demodulate modulation symbols to acquire encoded bits in the PDSCH by using a first modulation mapping or a second modulation mapping, wherein
in a case that the DCI is defined in a prescribed DCI format,
the first modulation mapping is used for demodulating the modulation symbols, and
the modulation symbols are given based on at least a plurality of bits, the plurality of bits being independent of the encoded bits.

6. The terminal apparatus according to claim 5, wherein the prescribed DCI format is used in a prescribed transmission mode.

7. The terminal apparatus according to claim 5, wherein
in a case that the second modulation mapping is used,
the modulation symbols include at least first modulation symbols, second modulation symbols, third modulation symbols, or fourth modulation symbols, where each of the first modulation symbols has real-part value of $1/\sqrt{2}$ and imaginary-part value of $1/\sqrt{2}$ for '00' included in the encoded bits,
each of the second modulation symbols has real-part value of $1/\sqrt{2}$ and imaginary-part value of $-1/\sqrt{2}$ for '01' included in the encoded bits,
each of the third modulation symbols has real-part value of $-1/\sqrt{2}$ and imaginary-part value of $1/\sqrt{2}$ for '10' included in the encoded bits, and
each of the fourth modulation symbols has real-part value of $-1/\sqrt{2}$ and imaginary-part value of $-1/\sqrt{2}$ for '11' included in the encoded bits.

8. A communication method for a terminal apparatus configured to communicate with a base station apparatus, the communication method comprising steps of:

receiving downlink data carried in a physical downlink shared channel (PDSCH) and downlink control information (DCI) through a physical downlink control channel (PDCCH), demodulating modulation symbols to acquire encoded bits in the PDSCH by using a first modulation mapping or a second modulation mapping, wherein in a case that the DCI is defined in a prescribed DCI format, the first modulation mapping is used for demodulating the modulation symbols, and the modulation symbols are given based on at least a plurality of bits, the plurality of bits being independent of the encoded bits.

* * * * *